US010706570B2

(12) United States Patent
Lohry et al.

(10) Patent No.: US 10,706,570 B2
(45) Date of Patent: Jul. 7, 2020

(54) SYSTEM AND METHOD TO ACQUIRE THE THREE-DIMENSIONAL SHAPE OF AN OBJECT USING A MOVING PATTERNED SUBSTRATE

(71) Applicant: Phasica, LLC, North Sioux City, SD (US)

(72) Inventors: Will Lohry, North Liberty, IA (US); Samuel Robinson, Los Angeles, CA (US)

(73) Assignee: Phasica, LLC, North Sioux City, SD (US)

( * ) Notice: Subject to any disclaimer, the term of this patent is extended or adjusted under 35 U.S.C. 154(b) by 262 days.

(21) Appl. No.: 15/981,452

(22) Filed: May 16, 2018

(65) Prior Publication Data

US 2019/0147609 A1      May 16, 2019

Related U.S. Application Data

(60) Provisional application No. 62/506,894, filed on May 16, 2017.

(51) Int. Cl.
| | |
|---|---|
| *G06K 9/00* | (2006.01) |
| *G06T 7/55* | (2017.01) |
| *G06T 7/60* | (2017.01) |
| *G06T 7/521* | (2017.01) |
| *G06K 9/20* | (2006.01) |

(52) U.S. Cl.
CPC ............ *G06T 7/55* (2017.01); *G06K 9/00201* (2013.01); *G06K 9/2036* (2013.01); *G06T 7/521* (2017.01); *G06T 7/60* (2013.01)

(58) Field of Classification Search
CPC .... G06K 9/00201; G06K 9/2036; G06T 7/55; G06T 7/521; G06T 7/60
See application file for complete search history.

(56) References Cited

U.S. PATENT DOCUMENTS

| | | | | |
|---|---|---|---|---|
| 6,700,669 | B1* | 3/2004 | Geng | G01B 11/2513 356/602 |
| 7,724,379 | B2* | 5/2010 | Kawasaki | G01B 11/2509 356/603 |
| 7,929,751 | B2* | 4/2011 | Zhang | G06T 7/521 356/511 |
| 8,844,802 | B2* | 9/2014 | Fedorovskaya | G06K 9/2036 235/375 |
| 2002/0041380 | A1* | 4/2002 | Kwan | G03F 7/70775 356/616 |
| 2018/0104947 | A1* | 4/2018 | Poulikakos | B41J 2/145 |
| 2019/0147609 | A1* | 5/2019 | Lohry | G06K 9/00201 382/154 |

OTHER PUBLICATIONS

Proceedings of SPIE—"High-speed 3D surface measurement with mechanical projector".
Optics and Lasers in Engineering—"High-speed three-dimensional shape measurement using GOBO projection".

* cited by examiner

*Primary Examiner* — Gregory M Desire
(74) *Attorney, Agent, or Firm* — Nyemaster Goode, PC

(57) ABSTRACT

A system and method for acquiring the three-dimensional shape of an object. At least one camera captures a scene in which a projected pattern is moved across an object and reference surface. The movement of said pattern need not be perfectly uniform, because differences in the movement at each step are detected and compensated. This compensation reduces the required hardware complexity and cost.

15 Claims, 27 Drawing Sheets

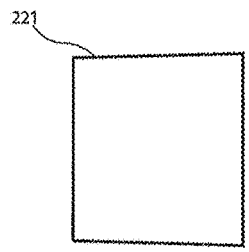 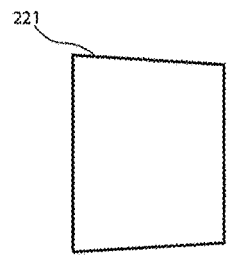
FIG. 13A            FIG. 13B
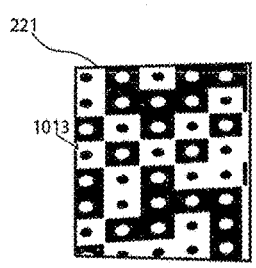 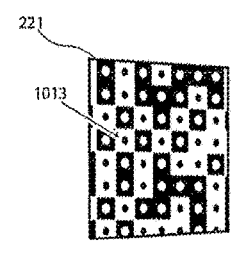
FIG. 13C            FIG. 13D
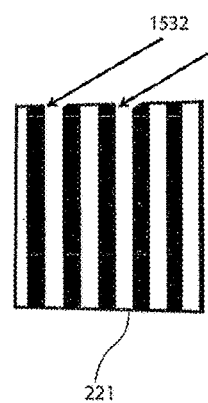 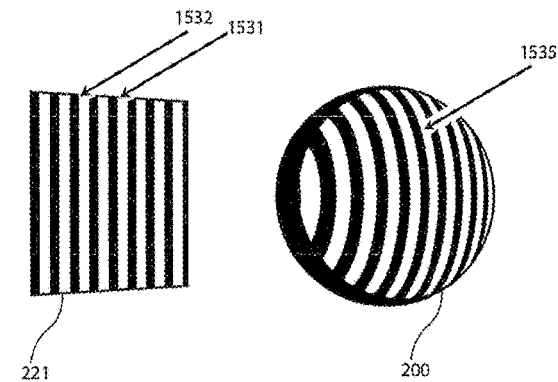
FIG. 13E            FIG. 13F

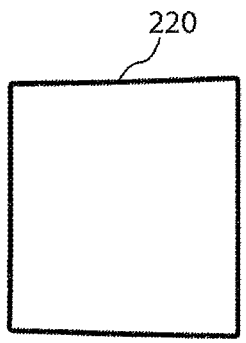
FIG. 15A — LED Off Red Channel
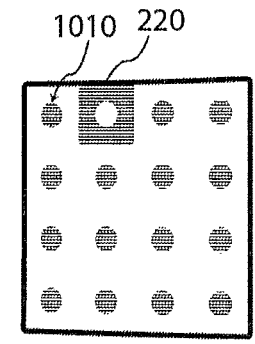
FIG. 15B — LED Off Green Channel
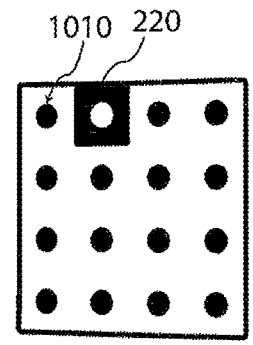
FIG. 15C — LED Off Blue Channel
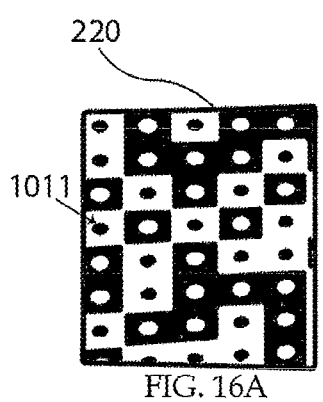
FIG. 16A — LED On Red Channel
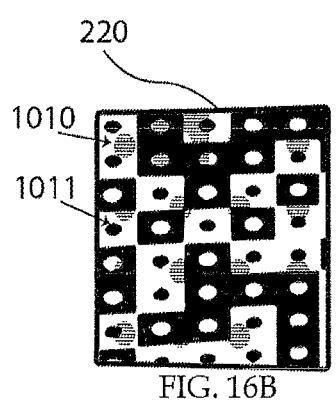
FIG. 16B — LED On Green Channel
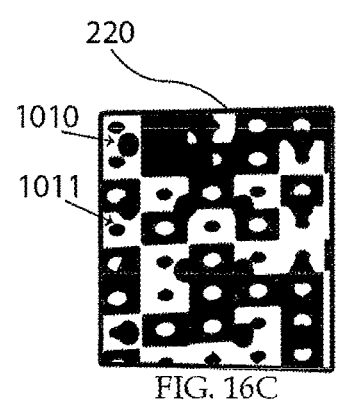
FIG. 16C — LED On Blue Channel

SYSTEM AND METHOD TO ACQUIRE THE THREE-DIMENSIONAL SHAPE OF AN OBJECT USING A MOVING PATTERNED SUBSTRATE

BACKGROUND

This application is based upon U.S. Provisional Application Ser. No. 62/506,894 filed May 16, 2017, the complete disclosure of which is hereby expressly incorporated by this reference.

Engineers and digital artists often use three-dimensional (3D) scanners to create digital models of real-world objects. An object placed in front of the device can be scanned to make a 3D point cloud representing the surface geometry of the scanned object. The point cloud may be converted into a mesh importable into computers for reverse engineering, integration of hand-tuned components, or computer graphics.

Various methods of illumination, capture, and 3D mesh generation have been proposed. The most common illumination methods are structured light and laser line scanning. Most systems employ one or more cameras or image sensors to capture reflected light from the illumination system. Images captured by theses cameras are then processed to determine the surface geometry of the object being scanned. Structured light scanners have a number of advantages over laser line or laser speckle patterns, primarily a greatly increased capture rate. The increased capture rate is due to the ability to capture a full surface of an object without rotating the object or sweeping the laser. Certain techniques in structured light scanning enable the projection of a continuous illumination function (as opposed to the discrete swept line of a laser scanner) that covers the entire region to be captured; the camera or cameras capture the same region illuminated by the pattern. Traditionally, structured light scanners consist of one projector and at least one image sensor (camera). The projector and camera are typically fixed a known distance apart and disposed in such a fashion that the field of view of the camera coincides with the image generated by the projector. The overlap region of the camera and projector fields of view may be considered the capture volume of the 3D scanner system. An object placed within the capture volume of the scanner is illuminated with one or more patterns generated by the projector. Each of these patterns is often phase-shifted (i.e. a periodic pattern is projected repeatedly with a discrete spatial shift). Sequential images may have patterns of different width and periodicity. From the perspective of the camera, the straight lines of the projected image appear to be curved or wavy. Image processing of the camera's image in conjunction with the known separation of the camera and projector may be used to convert the distortion of the projected lines into a depth map of the surface of the object within the field of view of the system.

Among structured light scanners, pattern generation methods wherein a repeating pattern is projected across the full field of view of the scanner are the most common. An illumination source projects some periodic function such as a square binary, sinusoidal, or triangular wave. Some methods alter the position of an imaging substrate (e.g. a movable grating system) (See U.S. Pat. Nos. 5,581,352 and 7,400,413) or interferometers (See U.S. Pat. No. 8,248,617) to generate the patterns. The movement of the imaging substrate in these prior art methods requires very precise movement and the patterns generated will often have higher order harmonics which introduces spatial error. These disadvantages limit the applicability of movable grating systems for mass appeal.

The methods disclosed herein seek to solve the problems posed by existing movable imaging substrate techniques and devices. The present invention reduces cost, increases manufacturability and increases projection speed and thereby 3D capture speed over current systems.

SUMMARY

One aspect of the invention relates to a system for capturing and determining the three-dimensional geometry of an object. The system includes a camera, a projector, a reference surface, a patterned substrate, and an actuator. The components of the system are adapted to translate a patterned substrate between a first position and a second position, project said substrate onto said reference surface and object, and capture a series of images. Each of the series of images relates to a different position of the projected pattern. The patterned substrate is disposed between the projector light source and projection optics such that an image of the patterned substrate is projected onto the reference surface and the object being captured. The projected image of the patterned substrate is herein referred to as the "projected pattern." The patterned substrate may be translated along one axis to translate the projected pattern across the object, enabling the camera to capture a series of images, each corresponding to a different region of the patterned substrate. The reference surface may either be the object itself or a separate surface and is used to measure the position of the patterned substrate and may or may not have physical markers printed thereon and be referred to herein as a marker board. In order to measure the position of the patterned substrate, the captured images of the projected pattern must be distortion-corrected remapped to match the perspective of the projector. If a marker board is used and has printed markers with a known dimension, the printed markers can be used to determine the orientation of the marker board with respect to the camera. Otherwise, if a reference surface is used and does not have markers, then a projected calibration pattern can be used to provide a distortion-correction mapping between camera coordinates and projector coordinates. In either case, an image of the projected pattern may be remapped to match the perspective of the projector.

Another aspect of the invention relates to a method of using the system described above to measure the position of the projected pattern using an image processing technique. This technique compensates for uneven mechanical movement of a patterned substrate by estimating the position accurately using only captured images.

The technique, when applied to a sequence of captured images, provides a method of temporally-simulating images that would have been captured if the movement of the pattern were perfectly uniform, even in the presence of mechanical positioning error. Together this system and method enable high precision 3D geometry capture using a low-cost device.

Another aspect of the invention relates to a method for determining the three-dimensional geometry of an object, referred to herein as "direct 2D mapping." The method includes projecting a first pattern from a first region of a patterned substrate onto an object and onto a reference surface to create a first projected pattern. Then capturing an image containing the reference surface and object to be captured while the patterned substrate is projected onto them and storing the image on a processor. The patterned substrate is moved so that a different region of the patterned substrate is projected onto the object and the reference surface to create a second image. The second image is captured and stored in the processor. The images are used to produce a mapping between the camera images and projector, and using said mapping to produce a distortion-corrected remapped image which simulates the view from the projector. This allows the movement of the patterned substrate to be detected using image analysis alone. In some embodiments the mapping is created by projecting a pattern onto the refence surface and capturing an image of the refence surface and the object. This image is used to create a mapping between the projector and the camera. This mapping is then applied to at least two further images wherein a different region of the patterned substrate is projected during each image capture. This process generates a first and a second distortion-corrected remapped image, which are used with an interpolation algorithm to produce a temporally-simulated image which simulates a captured image wherein a third region of the patterned substrate is projected, and wherein the third region of the patterned substrate is between the first region and the second region. A temporally-simulated image may be used to compute relative and absolute phase and compute the three-dimensional geometry of the object by applying a phase shifting algorithm. In some embodiments the image is projected onto the object without the use of a reference surface.

Another aspect of the invention relates to a method for determining the three-dimensional geometry of an object, referred to herein as "3D to 2D mapping." The method includes projecting a pattern from a region of a patterned substrate onto an object and onto a marker board to create a projected pattern, wherein the marker board includes a printed pattern thereon having markers in a predetermined color with a known spatial relationship. Then capturing an image of said marker board and storing the image on a processor. These images are used to generate a first and a second distortion-corrected remapped image, which are used with an interpolation algorithm to produce a temporally-simulated image which simulates a captured image wherein a third region of the patterned substrate is projected, and wherein the third region of the patterned substrate is between the first region and the second region. A temporally-simulated image may be used to compute relative and absolute phase and compute the three-dimensional geometry of the object by applying a phase shifting algorithm.

Another aspect of the invention relates to a method of using the system described above to capture and determine the shape of an unknown 3D object. The method generally includes projecting a first region of said patterned substrate onto said object and said reference surface to produce a first projected pattern then capturing an image of said first projected pattern. The position of the patterned substrate is changed then the projector projects a second region of said patterned substrate onto said object and said reference surface to produce a second projected pattern. The image of the second projected pattern is captured by the system. The captured image of first projected pattern and the captured image of second projected pattern are used to estimate each position of the patterned substrate. The captured images and said estimated positions are used to produce a temporally-simulated image simulating the patterned substrate with a different position. The temporally-simulated images are used to compute the three-dimensional geometry of said object.

BRIEF DESCRIPTION OF DRAWINGS

Embodiments of the invention will be more fully understood by referencing the detailed description in conjunction with the following figures.

FIG. 13A is an example camera image of a reference surface and object when the projection module is off and the reference surface is in a first state of rotation.

FIG. 13B is similar to FIG. 13A except that the reference surface is in a second state of rotation.

FIG. 13C is an example camera image of a reference surface and object when a pattern is projected onto them and the reference surface is in a first state of rotation.

FIG. 13D is similar to FIG. 13C except that the reference surface is in a second state of rotation.

FIG. 13E is an example camera image of a reference surface and object when a different pattern is projected onto them and the reference surface is in a first state of rotation.

FIG. 13F is similar to FIG. 13E except that the reference surface is in a second state of rotation.

FIG. 15A shows the red color channel of an image captured by a camera of a marker board.

FIG. 15B shows the green color channel of an image captured by a camera of a marker board.

FIG. 15C shows the blue color channel of an image captured by a camera of a marker board.

FIG. 16A shows the red color channel of an image captured by a camera of a pattern projected onto a marker board.

FIG. 16B shows the green color channel of an image captured by a camera of a pattern projected onto a marker board.

FIG. 16C shows the blue color channel of an image captured by a camera of a pattern projected onto a marker board.

DETAILED DESCRIPTION

Embodiments of the invention are described herein with reference to certain formulas wherein the variables refer to the following values.

$I^C$ Captured camera image
$I^{SP}$ Simulated projector image
$I^{SC}$ Simulated camera image
t, $t_0$, $t_1$, Computed shift of pattern such that one temporal shift corresponds to a pattern shift of 1 projector pixel.
$X_j$, $Y_j$, $Z_j$ 3D coordinates of marker board j
Marker board Reference surface with features and known dimension
Patterned substrate Part of the projection module.
[R|T] Transformation matrices between marker board and camera
[$R^P$|$T^P$] Transformation matrices between projector and camera
(u, v) Camera image coordinates of $I^C$ or $I^{SC}$
($u^P$, $v^P$) Projector image coordinates of $I^{SP}$
($u^s$, $v^s$) Coordinates on patterned substrate
$U_k$ Measured position of patterned substrate at frame k.
$\tilde{U}_m$ Desired position of pattern for simulated projector frame m
H Homography between image coordinates (u, v) and projector coordinates ($u^P$, $v^P$).
γ, $γ_0$, $γ_1$ Interpolation coefficient to simulate a camera image $I^{SC}(t)$ from two captured camera images $I^C(t_0)$ and $I^C(t_1)$
P Pitch of the sinusoid
α, β Mean value and amplitude of the sinusoid, respectively
N Number of interpolated or simulated sinusoids used to compute phase.
M Number of sets of size P to integrate over while computing phase of the simulated projection image.

Figure 1:
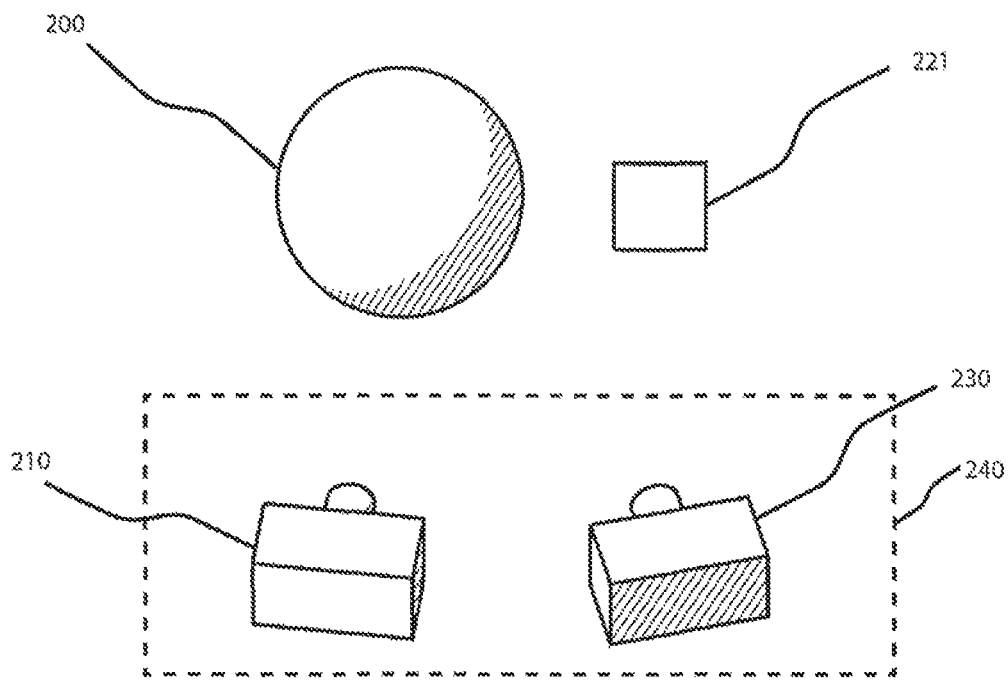
FIG. 1 is a schematic representation of the 3D scanner apparatus according to an embodiment of the invention.

One aspect of the invention relates to a system for capturing and determining the three-dimensional geometry of an unknown object. FIG. 1 illustrates the general components of the system, including a scanner 240 which comprises projector module 230 and camera 210. Projector module 230 illuminates object 200 and reference surface 221. The scene is captured by camera 210. The reference surface 221 may or may not have a pattern printed thereon. As used herein, the term "marker board" is a reference surface 221 having a pattern printed thereon.

Figure 2:
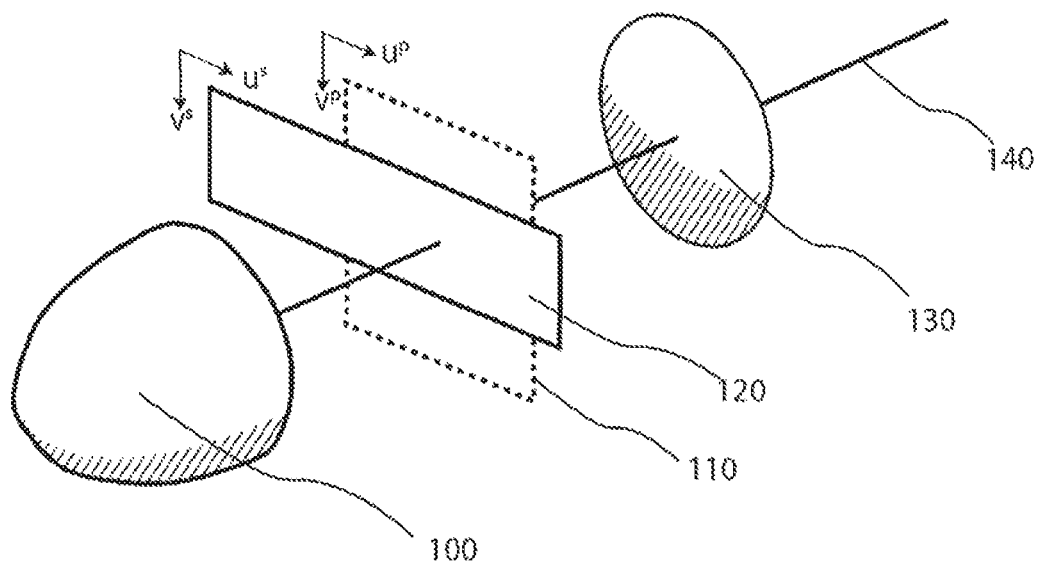
FIG. 2 is a simplified exploded view illustrating the relationship between the projector plane, the patterned substrate, and projector optical elements.

FIG. 2 illustrates the components of projector module 230 with optical axis 140. A lens 130 images the projection plane 110 and light source 100. Projection plane 110 has coordinate axis ($u^P$, $v^P$). Patterned substrate 120 with coordinate axis ($u^s$, $v^s$) is disposed coplanar with projection plane 110. In one embodiment patterned substrate 120 is a transparent or translucent member having one or more patterns thereon adapted to be illuminated for projecting the patterns onto the object 200 and reference surface 221. Projection plane 110 may be chosen so that movement of substrate 120 along projection plane 110 helps to ensure that the shortest distance between substrate 120 and projection optic 130 remains constant. Substrate 120 may be constrained to movement along projection plane 110 (referred to herein as "translation") such that the intersection of substrate 120 with projection axis 140 remains at a generally constant location on projection axis 140. Patterned substrate 120 may also rotate around projection axis 140. Patterned substrate 120 may rotate while remaining generally coplanar with projection plane 110. In some embodiments, patterned substrate 120 may have a transformation with the projection plane 110 (Scheimpflug principle).

Note that the coordinate ($u^P$, $v^P$) of projection plane 110 does not correspond to a specific point on patterned substrate 120 because the substrate can move. Rather, the projection coordinate refers to a specific location on projection plane 110 relative to projector lens 130. Projection plane 110 is generally coplanar to the focal plane of projection lens 130 and is located between illumination system 100 and projection lens 130. That is, while patterned substrate 120 is moving, the projector coordinate on projection plane 110 does not move with it but remains fixed.

If patterned substrate 120 is constrained such that motion can be approximated as translation, then for a given translation ($\Delta u(t)$, $\Delta v(t)$) at time t, the coordinate on projection plane 110 is related to the coordinate on patterned substrate 120 by ($u^s$, $v^s$)=($u^P+\Delta u(t)$, $v^P+\Delta v(t)$). If motion is further constrained to translation in the u-axis, then translation will be of the form ($\Delta u(t)$,0). If there exists some region in which the pattern on patterned substrate 120 is vertically identical, then for some range of values of δ, we have such that ($u^P$, $v^P$)=($u^P$, $v^P+\delta$). Under this condition, even if movement takes place in both the $u^P$- and $v^P$-axes, only the movement in the $u^P$-axis need to be considered. This is a special case of the aperture problem. For example, if patterned substrate 120 contains a sinusoidal region that varies along the $u^P$-axis only, then for some value of $u^P$, the intensity will be constant for all values of $v^P$. Thus, movement in the $v^P$-axis will not affect the measurement.

Figure 3:
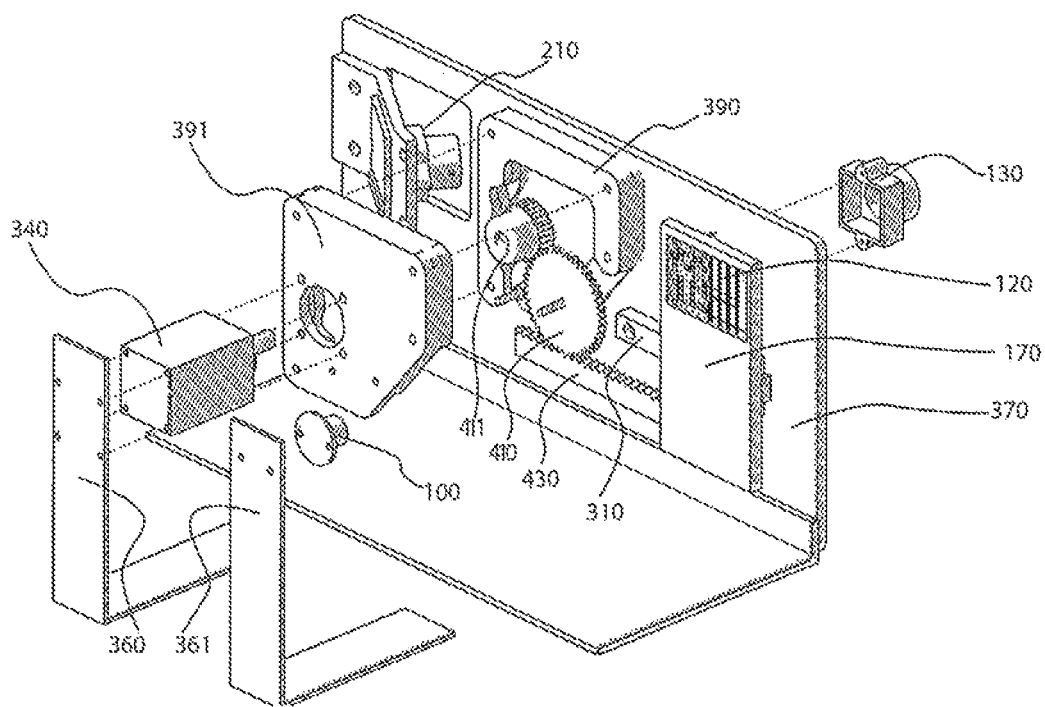
FIG. 3 is an exploded view illustrating one embodiment of a 3D scanner apparatus, including a camera, a projector, a motor, and a rack and pinion gear system attached to a carriage with a patterned substrate.

Any suitable actuator may be used to move the patterned substrate between its first position and second position, including a motor and gear, a microelectromechanical system (MEMS) device, a solenoid, and a piezoelectric motor. FIG. 3 illustrates one embodiment of a scanner module and actuator mechanism to move carriage 170. Patterned substrate 120 is positioned by a carriage 170 such that patterned substrate 120 is imaged by the projector lens 130. In this embodiment, carriage 170 is moved along rail 310 by a motor 340. The carriage 170 is attached to rack 430. Pinion 410 rotates to move rack 430 and carriage 170. Pinion 410 is partially or fully enclosed in gearbox components 390 and 391. Gearbox component 391 attaches to motor 340, which is operably combined with gear 411. In some embodiments, motor 340 may attach directly to pinion 410. Light source 100 projects light through patterned substrate 120, which may be imaged by projection lens 130. Camera 210 is attached to any suitable component, such as the front plate 370.

Figure 4:
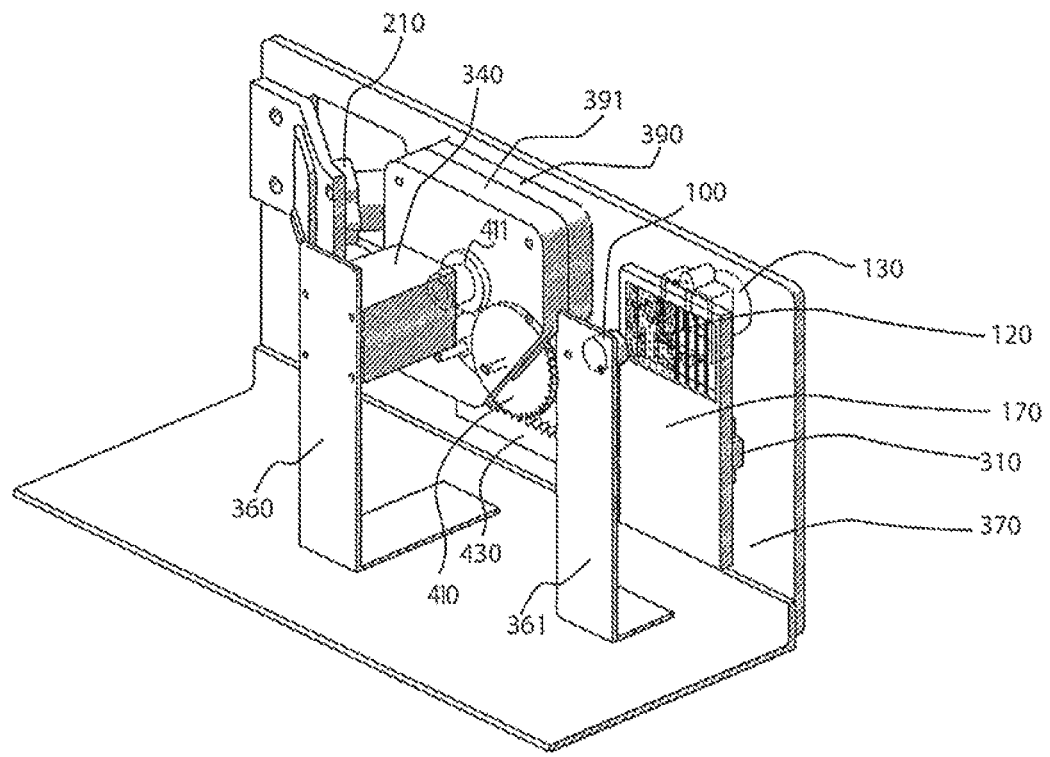
FIG. 4 is a perspective view illustrating the same system as in FIG. 3, except that the system is shown assembled.

FIG. 4 illustrates the same system as in FIG. 3, except that the system is shown assembled.

Figure 5:
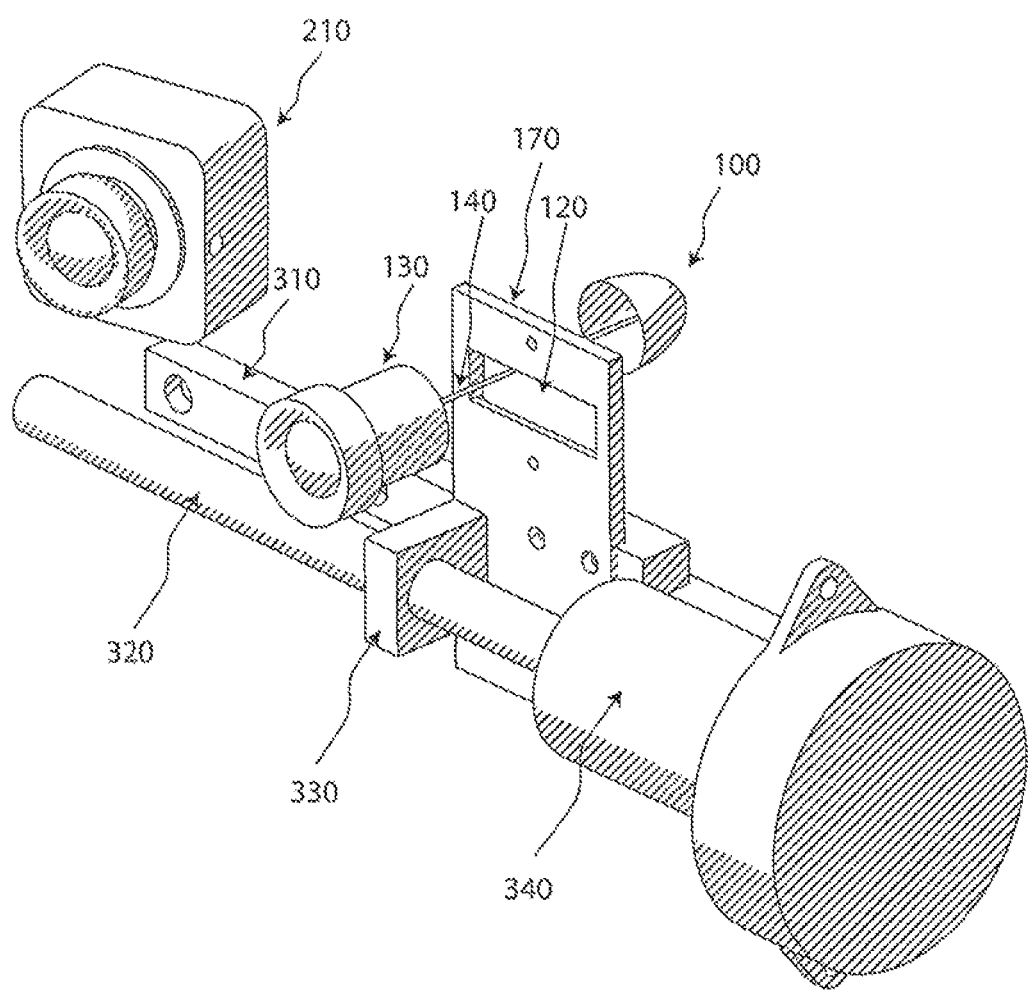
FIG. 5 is a simplified perspective view illustrating one embodiment of a 3D scanner apparatus, including a camera, a projector, and a motor with threaded shaft that shifts a carriage with a patterned substrate.

FIG. 5 illustrates another embodiment of a scanner module and the actuator mechanism to move carriage 170. Patterned substrate 120 is positioned by a carriage 170 such that patterned substrate 120 is imaged by the projector lens 130. Carriage 310 is connected to nut 330 which is threaded onto adjustment screw 320. Carriage 170 may be translated along the axis of rail 310. As adjustment screw 320 rotates, carriage 170 and nut 330 may be translated along rail 310. Adjustment screw 320 may be rotated by motor 340. Rail 310 and adjustment screw 320 enable movement of carriage 170 such that patterned substrate 120 moves perpendicular to optical axis 140. Carriage 170 may be translated along a plane perpendicular to axis 140 such that the shortest distance between any point on carriage 170 and any point on projection optic 130 remains constant. A camera 210 captures the object.

Figure 6:
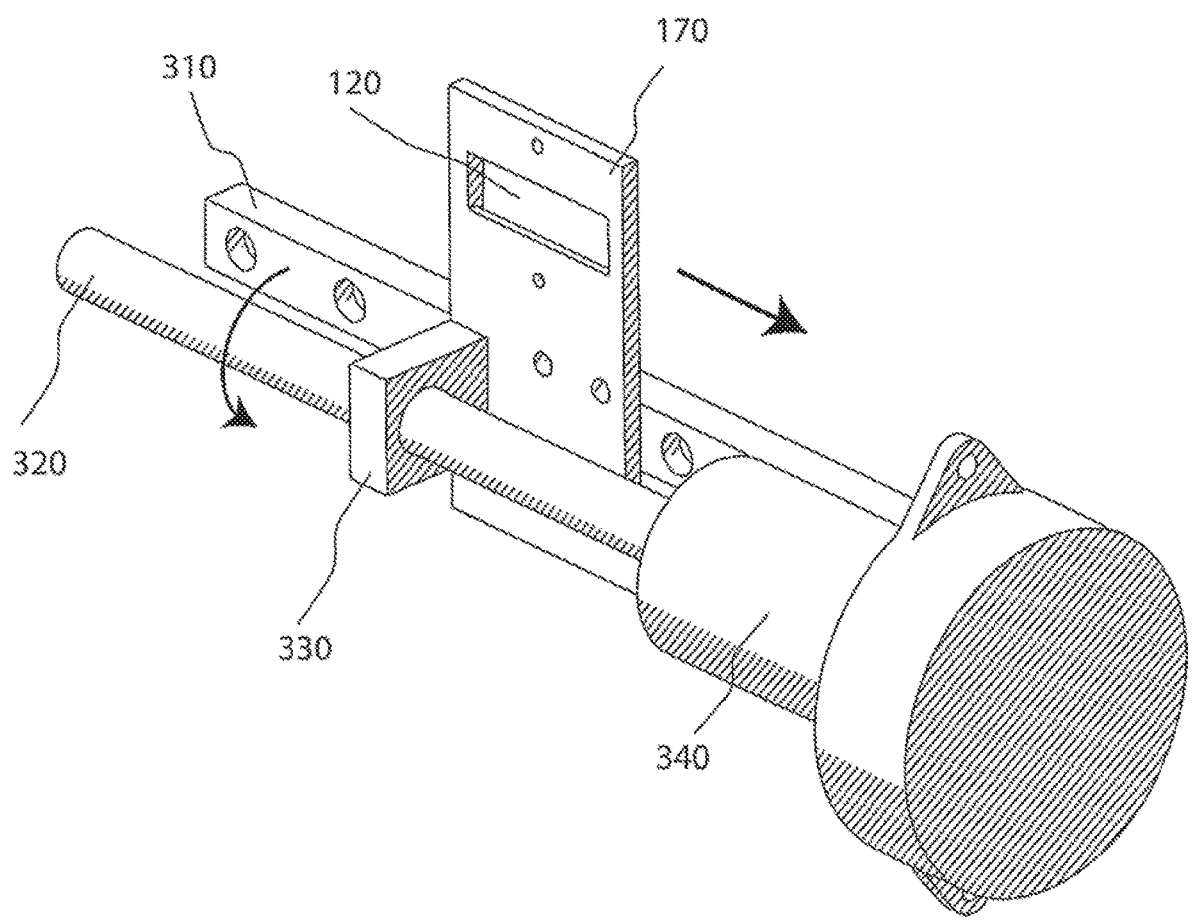
FIG. 6 is a simplified perspective view illustrating the movement of the patterned substrate shown in FIG. 5.

FIG. 6 illustrates the movement actuator mechanism of the scanner module shown in FIG. 5. The motor 340 rotates the screw 320 attached to nut 330, moving the carriage 170 along rail 310. Carriage 170 moves the patterned substrate 120.

Figure 7:
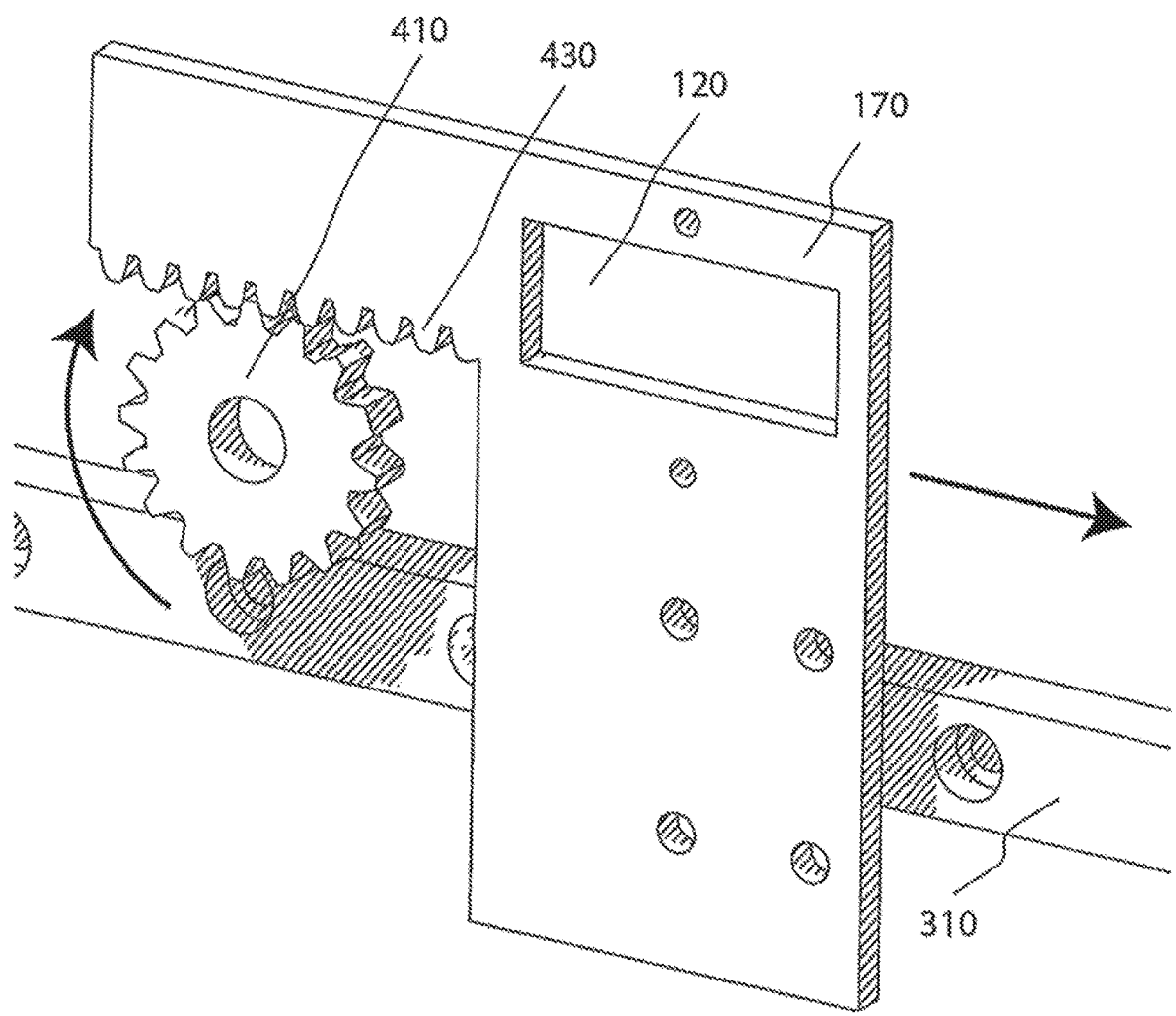
FIG. 7 is a simplified perspective view illustrating a rack and pinion translating a carriage with a patterned substrate.

FIG. 7 illustrates another embodiment of the actuator mechanism to move carriage 170. In this embodiment, gear 410 is rotated by a motor (not shown). Teeth of gear 410 mesh with teeth on carriage 170 enabling carriage 170 to translate along rail 310. In some embodiments, gear 410 may be connected with additional gears that in turn translate carriage 170, thereby altering the relationship between rotation of gear 410 and translation of carriage 170.

Figure 8:
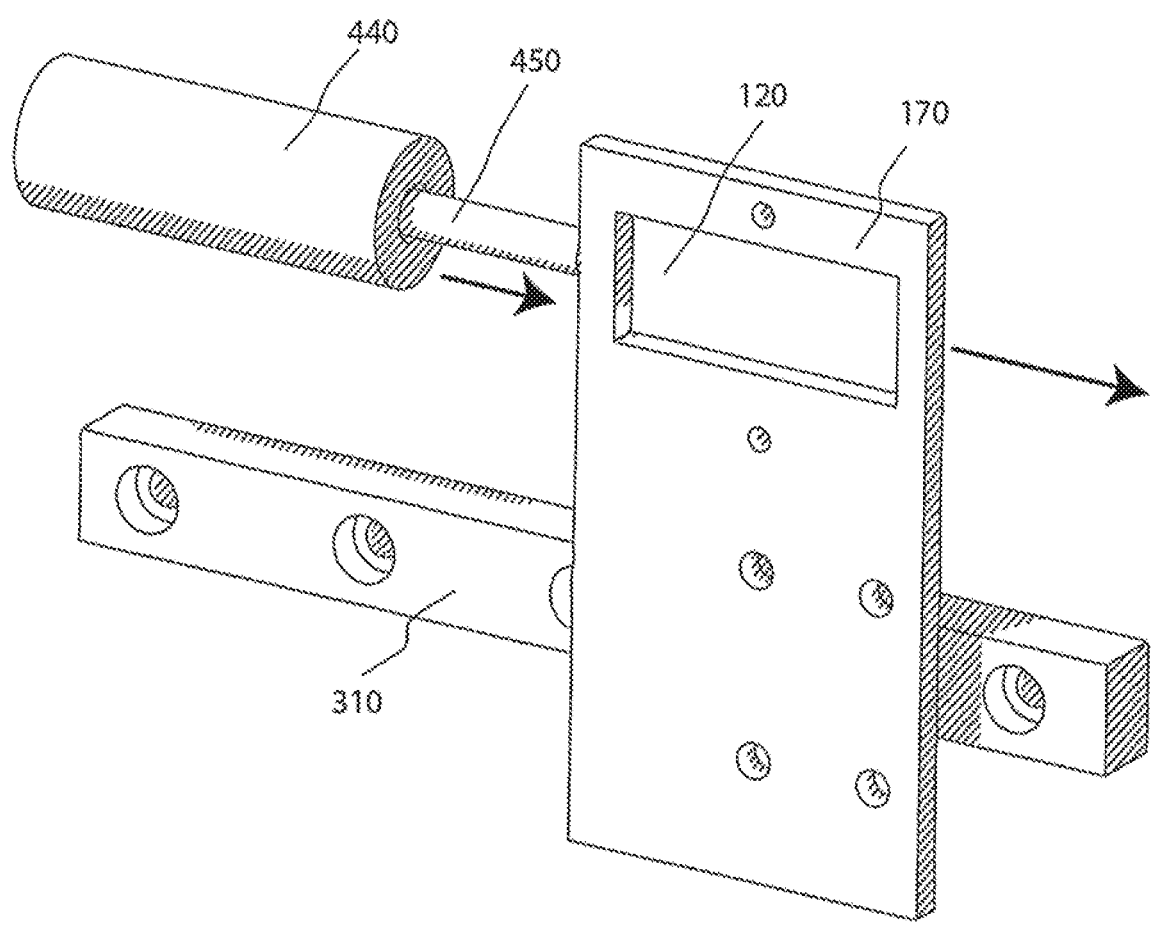
FIG. 8 is a simplified perspective view illustrating a linear actuator moving a carriage with a patterned substrate.

FIG. 8 illustrates another embodiment of the actuator mechanism to move carriage 170. In this embodiment, carriage 170 is connected to shaft 450 of proportional solenoid 440. As proportional solenoid 440 extends and retracts shaft 450. Carriage 170 is translated along rail 310.

Figure 9:
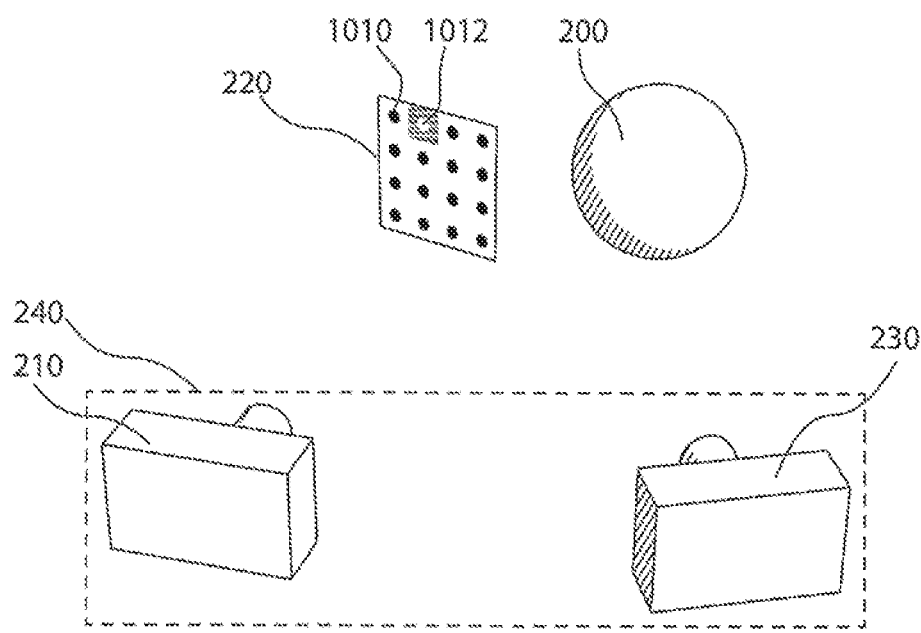
FIG. 9 is a schematic view illustrating a marker board in a first state of rotation, an object, and a 3D scanner apparatus comprising a projector and a camera.

FIG. 9 depicts object 200 and marker board 220 situated in the capture region of scanner 240. Scanner comprises camera 210 and projection module 230. Marker board 220 is positioned in a first state of rotation. Marker board 220 has a pattern exemplified by markers 1010 and 1012. These markers should have a known absolute spatial relationship or dimension such that they can be used to determine the orientation of marker board 220 with respect to camera 210. The pattern on marker board 220 may be a circle grid array, checker board array, random pattern, or any other periodic or non-periodic pattern. The pattern may be printed, embossed, engraved, painted, adhered, or otherwise physically applied to marker board 220. The term "printed" is used herein to apply generally to any of these types of markers. The pattern may be of any single color, including black. Alternatively, pattern may be comprised of different colors in different regions. In one embodiment, marker 1010 is a black circle on a white background, whereas marker 1012 is a white circle on a black background. The difference in color between marker 1010 and marker 1012 allows the system to calibrate the position of the marker board 220 by identifying its degree of rotation relative to the projection plane 110 (FIG. 2). In another embodiment markers 1010 and 1012 are both the same (e.g., black circles on a white background) and the system does not calibrate for relative rotation of the marker board 220.

Marker board 220 need not be planar. Patterned substrate 120 could be projected onto a spherical shape, cylindrical shape, or other shape of known or unknown geometry. In some embodiments, reference surface 221 is object 200, and an initial approximation of the geometry of object 200 is used to generate map 2550 to convert pixels of camera image exemplified by image 2640 to remapped image exemplified by image 2660. The only requirements for reference surface 221 is that at least two projected markers exemplified by marker 1013 (FIG. 13*c*) are visible in the image captured by camera 210 and that it is possible to map any desired intermediate pixels between markers from the coordinate system of the captured image to coordinate system of projection plane 110 of patterned substrate 120. Examples of a marker pattern include but are not limited to: a sinusoidal pattern, a line grid, a checkerboard, a circles grid, an asymmetric circles grid, a random pattern, or a fiducial marker pattern.

Figure 10:
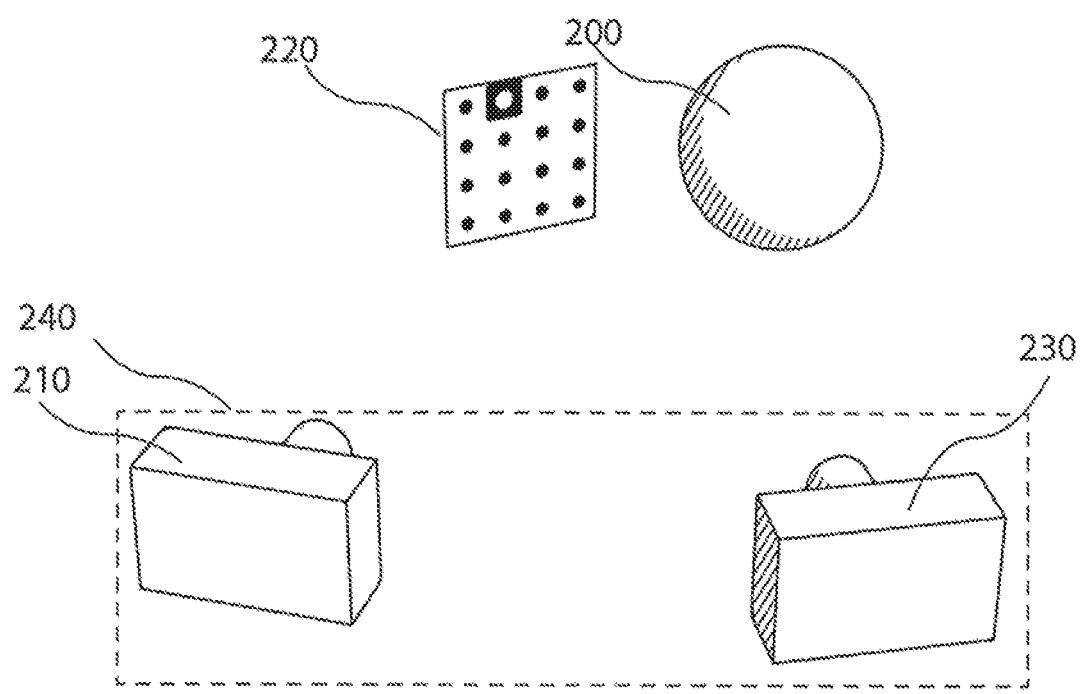
FIG. 10 is a schematic view similar to FIG. 9 except that the marker board is in a second state of rotation.

FIG. 10 depicts object 200 and marker board 220 situated in the capture region of scanner 240. Marker board 220 is positioned in a second state of rotation. As explained further below, the marker board 220 is not rotated during use. Instead, the different orientations of the marker board 220 in FIGS. 9 and 10 illustrate that the marker board 220 does not need to be oriented perfectly with respect to the projector 230 and/or camera 210.

Figure 11:
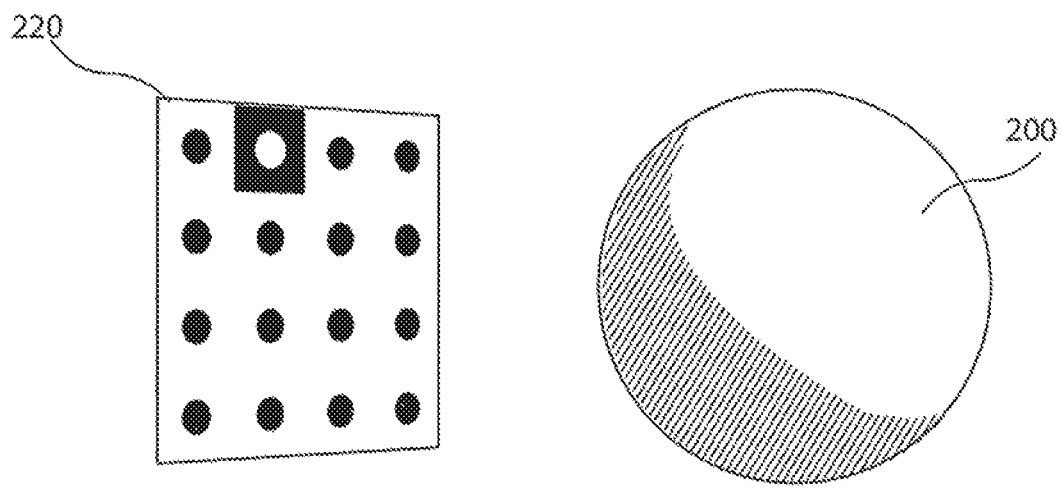
FIG. 11 is an example camera image illustrating camera image of an object and a marker board when the marker board is in a first state of rotation

FIG. 11 illustrates an image of object 200 and marker board 220 captured by camera 210. Marker board 220 is shown in a first state of rotation. In one embodiment, marker board 220 has a pattern on at least one face.

Figure 12:
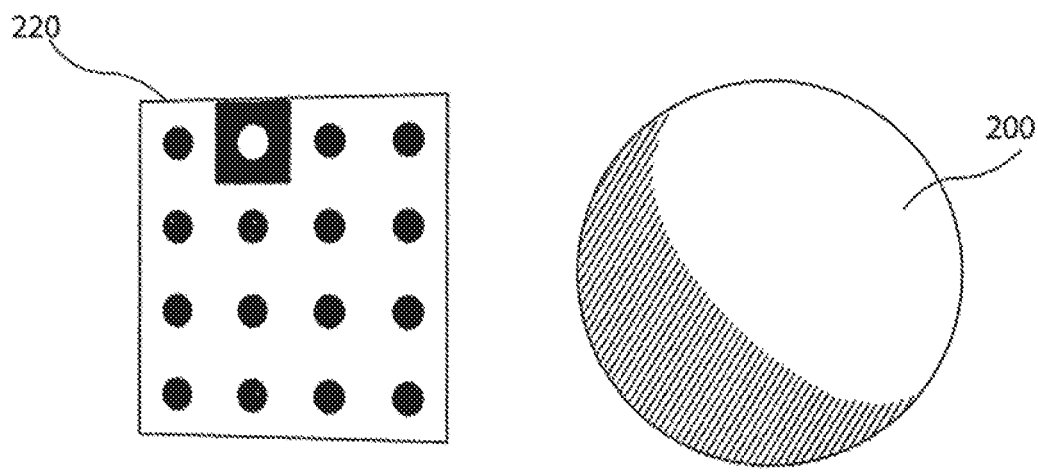
FIG. 12 is an example camera image similar to FIG. 11 is except that the marker board is in a second state of rotation.

FIG. 12 illustrates a similar image as in FIG. 11 with the exception that marker board 220 is in a second state of rotation. The different rotations of marker board 220 are not intended to represent movement during 3D capture, but rather to indicate that the method is invariant to the position and rotation of marker board 220 as long as camera 210 is able to image the markers and projector module 230 can project onto it.

FIG. 13 illustrates a set of images captured by camera 210 of object 200 and reference surface 221 situated in the capture region of scanner 240. In this embodiment the reference surface 221 does not have any patterns printed thereon. FIG. 13A and FIG. 13B. illustrate an image captured by camera 210 when projection module 230 is off. FIG. 13A illustrates reference surface 221 in a first state of rotation. FIG. 13B illustrates reference surface 221 in a second state of rotation. FIG. 13C and FIG. 13D4 illustrate an image captured by camera 210 of a pattern projected onto reference surface 221 and object 200. In some embodiments, this pattern may be one of random, periodic, or nonperiodic. In one embodiment, this projected pattern may comprise a number of circles and squares and is exemplified by projected spot 1013 and projected spot 1014. In FIG. 13C, when reference surface 221 is in a first state of rotation, projected spot 1013 appears a distance from the left edge of reference surface 221 and exhibits a diameter. FIG. 13D4, when reference surface 221 is in a second state of rotation, projected spot 1013 appears a further distance from the left edge of reference surface 221 than in FIG. 13C. This change in position and diameter of projected spot 1013 is caused by the change in orientation of reference surface 221 with respect to projection module 230. Projected spot 1014 does not change position or diameter between FIG. 13C and FIG. 13*d* because object 200 does not change position with respect to projection module 230. FIG. 13E and FIG. 13F illustrate an image captured by camera 210 of a second pattern projected onto reference surface 221 and object 200. In some embodiments, this pattern may be one of random, periodic, or nonperiodic. In one embodiment, a second projected pattern may comprise a number of vertical and parallel lines with a constant period, exemplified by projected lines 1531, 1532, and 1535. In FIG. 13E, projected line 1532 exhibits a distance from left of reference surface 221 and exhibits a distance from projected line 1531. In FIG. 13E, projected line 1531 exhibits a width. In FIG. 13F, projected line 1532 exhibits a greater distance from left of reference surface 221 and exhibits a small distance from projected line 1531. In FIG. 13F projected line 1531 exhibits a narrower width than in FIG. 13F. This change in width of projected line 1531 and the change in distance between projected lines 1531 and 1532 are caused by a change of orientation of reference surface 221 with respect to projection module 230 between FIG. 13E and FIG. 13F. Projected line 1535 does not change position or diameter between FIG. 13E and FIG. 13F because object 200 does not change orientation with respect to projection module 230.

The "Direct 2D mapping" method using reference surface 221 does not rely on calibrated extrinsic and intrinsic parameters of camera 210 or projector module 230. Rather, the "Direct 2D mapping" method uses a projected pattern exemplified by marker 1013 directly to compute a distortion-correction map, such as a homography, between the coordinates of camera 210 and projection plane 110 (shown in FIG. 2). During capture, a pattern exemplified by marker 1013 is projected onto reference surface 221 and captured using camera 210. Markers exemplified by marker 1013 projected onto reference surface 221 are detected and their corresponding coordinates on projection plane 110 (shown in FIG. 2) are determined. A collection of marker coordinates can then be used to compute the distortion-correction mapping between camera 210 and projection plane 110 (shown in FIG. 2). If the reference surface 221 is flat, then it is possible to compute a homography H such that for some marker j exemplified by marker 1013 with image coordinate $P_j^C = (u_j^C, v_j^C)$ and coordinate $P_j^P = (u_j^P, v_j^P)$ of projection plane 110 (shown in FIG. 2), the following relationship holds:

$$s \begin{bmatrix} u_j \\ v_j \\ 1 \end{bmatrix} = H \begin{bmatrix} u_j^P \\ v_j^P \\ 1 \end{bmatrix} + \begin{bmatrix} \varepsilon_{uj} \\ \varepsilon_{vj} \\ 0 \end{bmatrix}$$

where $(\varepsilon_{uj}, \varepsilon_{vj})$ represent the 2D error for point j. Here the homography H is a 3×3 matrix:

$$H = \begin{bmatrix} h_{11} & h_{12} & h_{13} \\ h_{21} & h_{22} & h_{23} \\ h_{31} & h_{32} & 1 \end{bmatrix}$$

The homography H can be solved using a least squares algorithm, a RANSAC algorithm, a least-median method, or other homography solver. In some embodiments, the error minimization algorithm may not attempt to minimize the error $(\varepsilon_{uj}, \varepsilon_{vj})$ for every j, but rather rely on one, some, or all the errors. In some embodiments, H may be an affine transformation. In some embodiments, one or more of the coefficients of H may be zero. In some embodiments, $h_{31}=h_{32}=0$. In some embodiments, the homography is a 2×2 matrix H' that satisfies the equation:

$$\begin{bmatrix} u_j \\ v_j \end{bmatrix} = H' \begin{bmatrix} u_j^P \\ v_j^P \end{bmatrix} + \begin{bmatrix} \varepsilon'_{uj} \\ \varepsilon'_{vj} \end{bmatrix}$$

where ($\varepsilon'_{uj}$, $\varepsilon'_{vj}$) represent the 2D error for point j. In some embodiments, the map is a function, such as a homeomorphism or a diffeomorphism, that maps each image pixel to a different image pixel. In some embodiments, the map is a polynomial, support vector machine, or other function that maps each image pixel to another pixel. In some embodiments, the marker board is used to generate a mask, such that analysis is constrained to a particular region of the captured image.

Figure 14A:
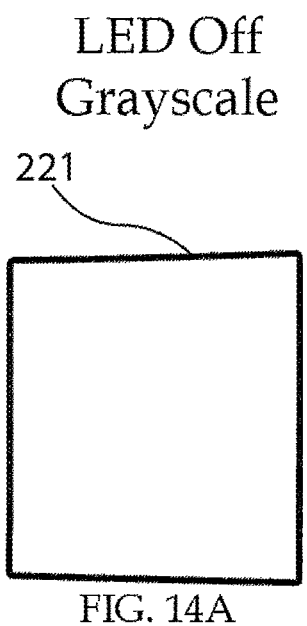
FIG. 14A shows an image captured by a camera of a reference surface while no pattern is projected onto it.
Figure 14B:
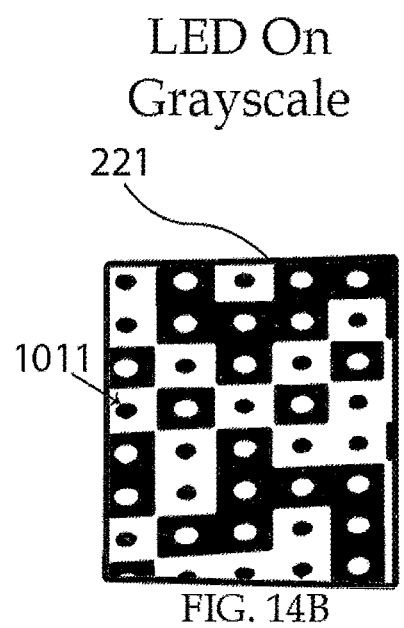
FIG. 14B shows an image captured by a camera of a reference surface while a pattern is projected onto it.

FIG. 14A illustrates an image captured by camera 210 of reference surface 221 in a first state of rotation while projection module 230 is turned off. In this embodiment the reference surface 221 does not have any patterns printed thereon. FIG. 14B illustrates an image captured by camera 210 of reference surface 221 in a first state of rotation while projection module 230 is turned on and projecting a pattern. In some embodiments, this pattern may be one of random, periodic, or nonperiodic. In one embodiment, this projected pattern may comprise a number of circles and squares and is exemplified by projected spot 1011. FIG. 14B illustrates that turning on projection module 230 projects spot 1011 on reference surface 221 which may or may not already exhibit an identifiable pattern.

FIG. 15 illustrates an image of marker board 220 as captured by camera 210 in which the three color channels of camera 210 are separated and viewed independently. The marker board 220 includes a printed pattern as shown in FIGS. 9-12, however, the pattern is seen differently by the camera 210 depending on which of the color channels of camera 210 is being used to view the marker board 220. FIG. 15A illustrates the red channel of the image of marker board 220, FIG. 15B illustrates the green channel of the image of marker board 220, and FIG. 15C illustrates the blue channel of the image of marker board 220. The color of marker 1010 on marker board 220 may be selected such that marker 1010 appears differently in each color channel of the image captured by camera 210 (not shown). In one embodiments, marker 1010 printed on the marker board 220 is orange, so that its contrast with the white background of marker board 220 is smallest in the red channel and greatest in the blue channel. In some embodiments, marker 1010 may not be visible in the red channel, visible in the green channel, and visible in the blue channel. Marker 1010 may have a different intensity in each color channel. In another embodiment, marker 1010 may appear in any number of the color channels with any intensity. Marker 1010 may have a color such that marker 1010 is visible in at least one channel and is not visible in at least one other channel. This difference in visibility between two color channels of the captured image allows the board to be treated as a marker board 220, in which printed patterns are visible, or as a reference surface 221, in which the printed patterns are not visible. This allows the projected pattern exemplified by projected marker 1011 (shown in FIG. 16A) to be viewed in the channel in which printed markers exemplified by marker 1010 (shown in FIG. 16A) are not visible, so that only the projected pattern exemplified by projected marker 1011 is visible in the captured image. This allows the same image from camera 210 to be split into separate channels, in which one channel captures the printed marker patterns and another channel captures the projected patterns.

FIG. 16 illustrates an image of marker board 220 captured by camera 210 in which three color channels are separated and viewed independently. Projection module 230 projects a pattern onto marker board 220. In some embodiments, this pattern may be one of random, periodic, or nonperiodic. In one embodiment, this projected pattern may comprise circles or squares and is exemplified by projected spot 1011. FIG. 16A illustrates the red color channel of an image of marker board 220 and projected spot 1011. In this channel, no markings printed on marker board 220 are visible by the camera 210 because the markers exemplified by marker 1010 (not visible) are printed in orange, which has low contrast against a white background in the red channel of the captured image. By comparison, the projected pattern exemplified by marker 1011 has a broad spectrum so that it has high contrast in all of the color channels. Hence the projected pattern exemplified by marker 1011 may be analyzed by using the red channel of the captured image. FIG. 16B illustrates the green color channel of an image of marker board 220 and projected spot 1011. In addition to projected pattern 1011, marker 1010 is visible. Marker 1010 is exemplary of the marker pattern printed on marker board 220. FIG. 16C illustrates the blue color channel of an image of marker board 220 and projected spot 1011. In addition to projected pattern 1011, marker 1010 is visible. In one embodiment, marker 1010 in FIG. 16C exhibits greater intensity than marker 1010 in FIG. 16B. In one embodiment, projected spot 1011 is visible in both the red color channel and the blue color channel, while marker 1010 is only visible in the blue color channel. When projection module 230 is turned on, only the projected pattern exemplified by projected spot 1011 on marker board 220 is visible in the red channel. Further, when projection module 230 is turned off, only the pattern exemplified by marker 1010 on marker board 220 is visible in the blue channel (see FIG. 15C). Therefore, it is possible to independently view either a printed pattern exemplified by spot 1010 or a projected pattern exemplified by spot 1011. Further, the image of a spot 1011 projected onto a marker board 220 may appear as though it were projected onto a reference surface 221 in the red color channel.

Figure 17:
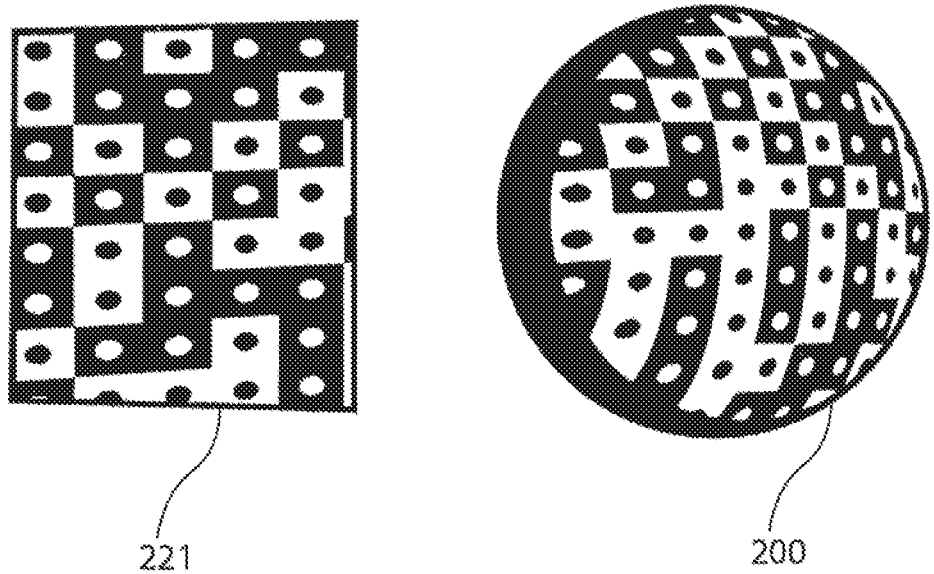
FIG. 17 shows images captured by a camera of a pattern projected onto an object and a marker board when the marker board is in a first state of rotation.

FIG. 17 illustrates an image captured by camera 210 of a pattern projected by projection module 230 onto reference surface 221 and object 200. Reference surface 221 is in a first state of rotation.

Figure 18:
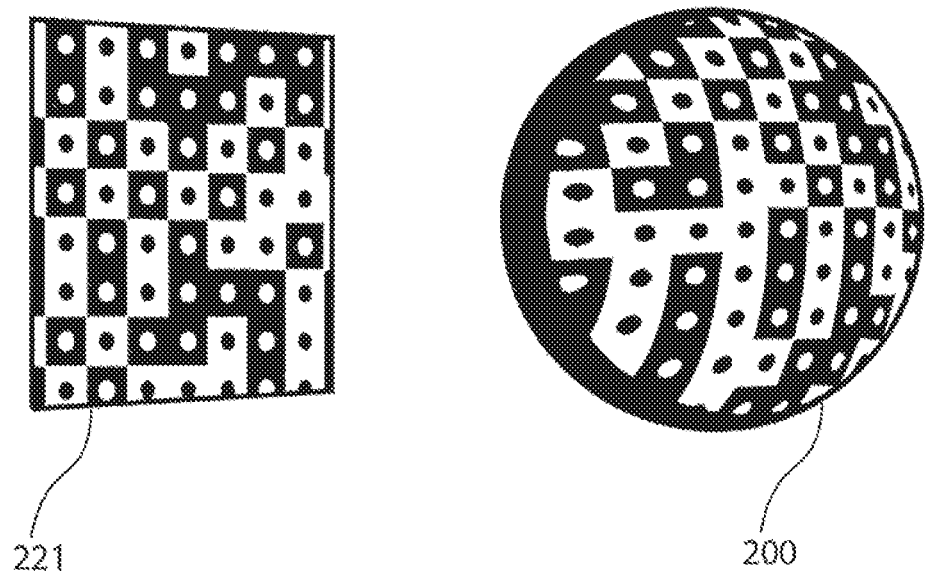
FIG. 18 shows images captured by a camera similar to FIG. 17 except that the marker board is in a second state of rotation.

FIG. 18 illustrates an image captured by camera 210 of a pattern projected by projection module 230 onto reference surface 221 and object 200. Reference surface 221 is in a second state of rotation. As with the printed patterns on the marker board 220 shown in some of the figures above, the reference surface 221 is not rotated during use. Instead, the different orientations of the reference surface 221 in FIGS. 17 and 18 illustrate that the reference surface 221 does not need to be oriented perfectly with respect to projector 230 and/or camera 210.

Figure 19:
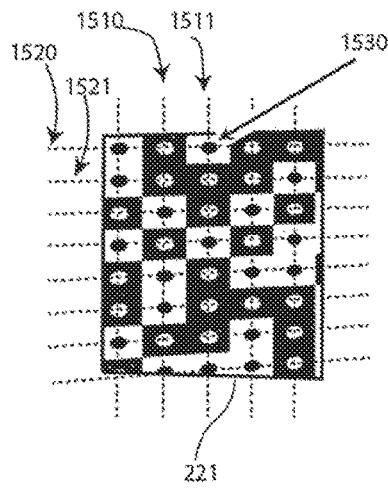
FIG. 19 is an expanded view of a region of the example camera image from FIG. 17 in which grid lines are superimposed over a pattern projected onto a marker board.

FIG. 19 illustrates an image captured by camera 210 of a pattern projected by projection module 230 onto reference surface 221. Dotted lines 1510, 1511, 1520, and 1521 have been superimposed over the captured image. Dotted lines 1520 and 1511 intersect at marker 1530. Dotted lines 1520 and 1521 represent lines of constant vertical coordinate in projector space. Dotted lines 1510 and 1520 represent lines of constant horizontal coordinate in projector space. In camera image coordinates, dotted lines 1510 and 1520 are not necessarily perpendicular. In camera image coordinates, dotted lines 1520 and 1521 are not necessarily parallel. In camera image coordinates, dotted lines 1510 and 1511 are not necessarily parallel.

Figure 20:
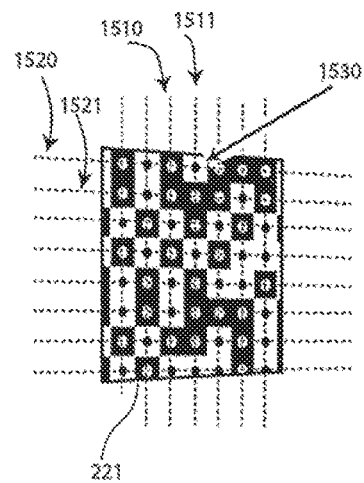
FIG. 20 is an expanded view of a region the example camera image from FIG. 18 in which grid lines are superimposed over a pattern projected onto a marker board

FIG. 20 depicts a similar image to FIG. 19, except that reference surface 221 is in a second state of rotation. Because reference surface 221 has a second state of rotation, grid lines 1520 and 1521 are oriented differently in the camera image compared to that observed in FIG. 19. As in FIG. 19, in FIG. 20 dotted lines 1511 and 1520 intersect at marker 1530. Compared to FIG. 19, the marker 1530 is observed at a different camera image coordinate. The distance between lines 1510 and 1511 is shorter in FIG. 20 than in FIG. 19 as a result of the different state of rotation between the two figures.

Figure 21:
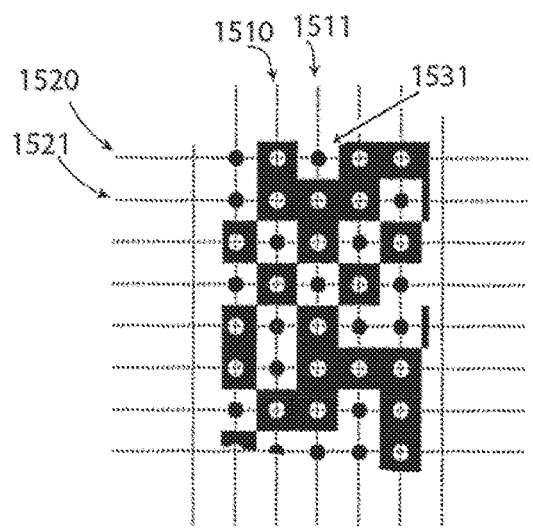
FIG. 21 illustrates a simulated projector image formed by remapping the captured image shown in FIG. 17.

FIG. 21 illustrates a distortion-corrected remapped image formed by remapping the captured image shown in FIG. 19. This figure demonstrates the undistorted view of the image of FIG. 19. As in camera space, in projector space marker 1530 lies at the intersection of lines 1511 and 1520. Unlike in camera space, in projector space dotted lines 1510, 1511, 1520, and 1521 form a rectilinear grid. In projector space, dotted line 1511 is perpendicular to dotted line 1520 and to dotted line 1521. In projector space, dotted line 1510 is parallel to dotted line 1511, and dotted line 1520 is parallel to dotted line 1521.

Figure 22:
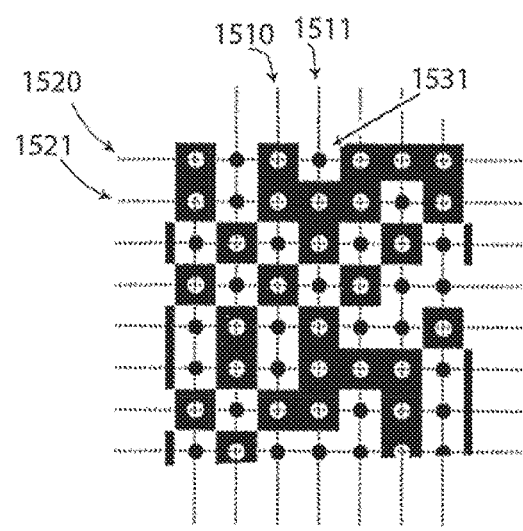
FIG. 22 illustrates a simulated projector image formed by remapping the captured image shown in FIG. 18.

FIG. 22 illustrates a distortion-corrected remapped image formed by remapping the captured image shown in FIG. 20. Despite the different state of rotation of board 221 shown in FIG. 19 and FIG. 20, the coordinate system of the remapped view is the same in FIG. 21 as in FIG. 22. As in FIG. 21, in FIG. 22 marker 1531 lies at the intersection of dotted lines 1520 and 1511. As in FIG. 21, grid lines 1520, 1521, 1510, and 1511 form a rectilinear grid, despite the different rotation of reference surface 221 used in the source image of FIG. 22 as compared to FIG. 21. The distance between dotted lines 1510 and 1511 is the same in FIG. 22 as it is in FIG. 21 despite the different state of rotation of reference surface 221, because the transformation to projector space eliminates the perspective distortion introduced by the orientation of reference surface 221 and by camera 210. This demonstrates that the method is invariant to rotation of reference surface 221 if it is within the view of the captured image.

Figure 23:
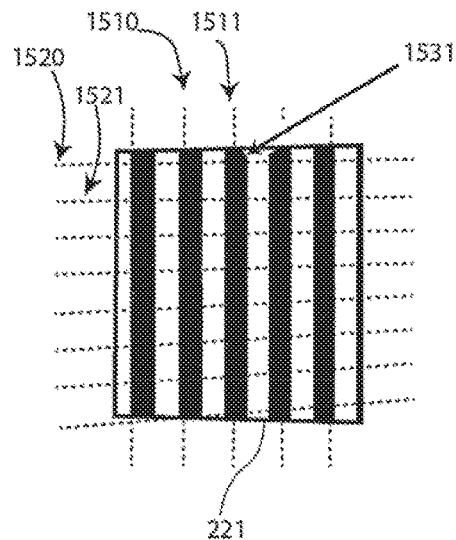
FIG. 23 illustrates a region of a captured image wherein a pattern of vertical, periodic lines is projected onto a marker board in a first state of rotation and grid lines are superimposed.

FIG. 23 illustrates an image captured by camera 210. Reference surface 221 is in a first state of rotation, as depicted in FIG. 19. The positions of dotted lines 1520, 1521, 1510, and 1511 are the same as in FIG. 19, because reference surface 221 is in the same state of rotation. Projected line 1531 intersects dotted line 1511 at a particular point.

Figure 24:
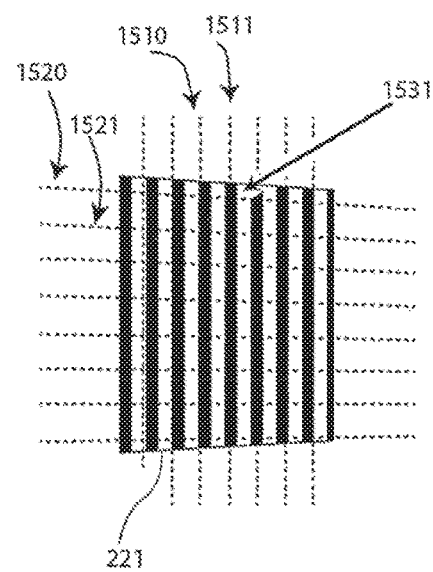
FIG. 24 illustrates a region of a captured image wherein a pattern of vertical, periodic lines is projected onto a marker board in a second state of rotation.

FIG. 24 illustrates an image captured by camera 210. Reference surface 221 is in a second state of rotation, as depicted in FIG. 20. The positions of dotted lines 1520, 1521, 1510, and 1511 are the same as in FIG. 20, because reference surface 221 is in the same state of rotation. Projected line 1531 intersects dotted line 1511 at a particular point. Dotted lines 1510 and 1511 are separated by less distance in FIG. 24 than in FIG. 23 because of the perspective of the projected pattern onto reference surface 221, as imaged by camera 210.

Figure 25:
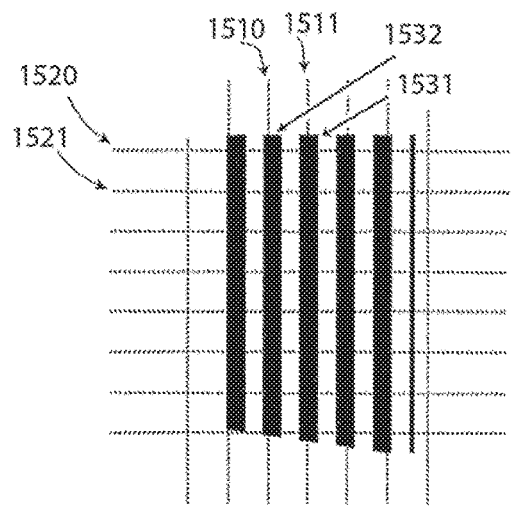
FIG. 25 illustrates a simulated projector image formed by remapping the captured image shown in FIG. 23.

FIG. 25 illustrates an image remapped using the same mapping used in FIG. 21.

Figure 26:
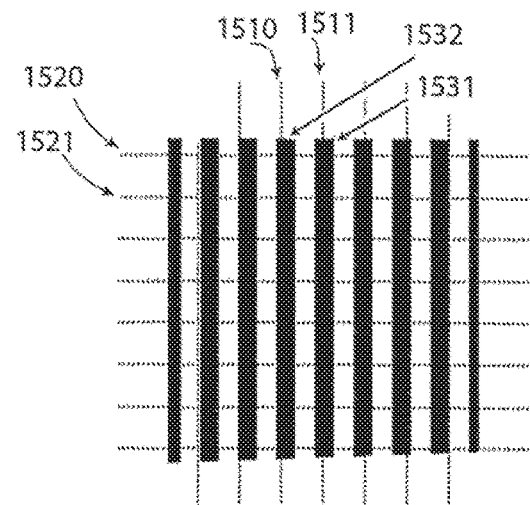
FIG. 26 illustrates a simulated projector image formed by remapping the captured image shown in FIG. 24.

FIG. 26 illustrates an image remapped using the same mapping used in FIG. 22, In projector space, projected line 1531 intersects dotted line 1511 at the same location in FIG. 26 as in FIG. 25. This is because the transformation from camera space to projector space eliminates the perspective introduced by reference surface 221 and imaged by camera 210. The distance between dotted lines 1510 and 1511 is the same in FIG. 26 as in FIG. 25 in projector space. In projector space, the width of line 1531 is the same in FIG. 26 as in FIG. 25. Further, the distance from line 1531 to line 1532 is the same in FIG. 26 as in FIG. 25. There are more lines visible in FIG. 26 than in FIG. 25 because the perspective of reference surface 221 allowed more lines to be projected and imaged by camera 210.

Figure 27:
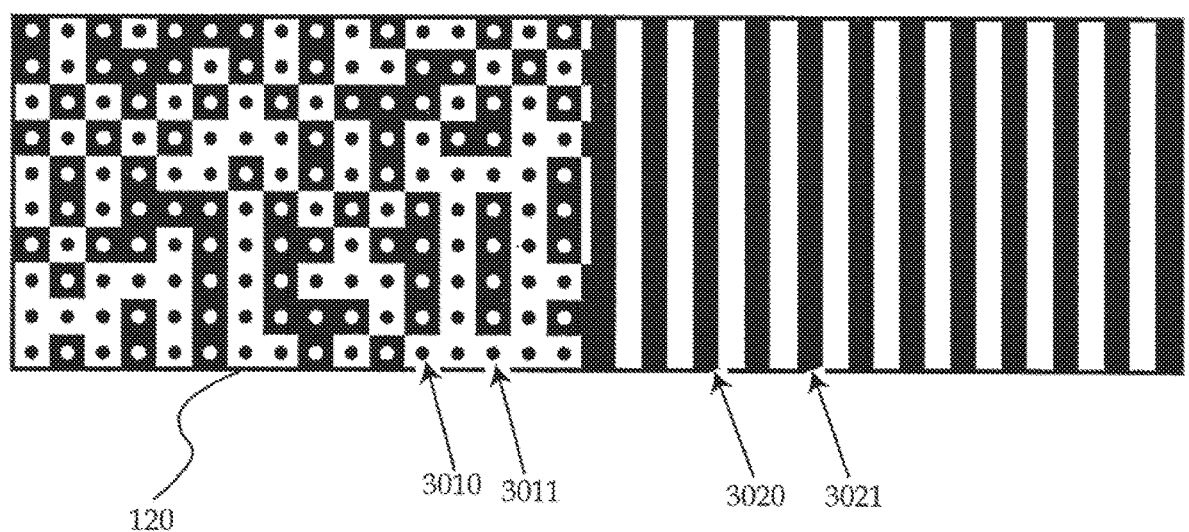
FIG. 27 is an example of a patterned substrate.

FIG. 27 is an example of a pattern to be projected. Patterned substrate 120 contains a marker region exemplified by markers 3010 and 3011 and a line region exemplified by line 3020 and line 3021. Markers 3010 and 3011 may be the same color or a different color. Markers 3010 and 3011 may be the same size or different size. Patterned substrate 120 contains a line region exemplified by lines 3020 and 3021. Lines 3020 and 3021 may have the same width or different width. Additional lines may be separated by the same width of white space or a different width of white space.

FIG. 28 shows the various stages of capture.

Figure 28A:
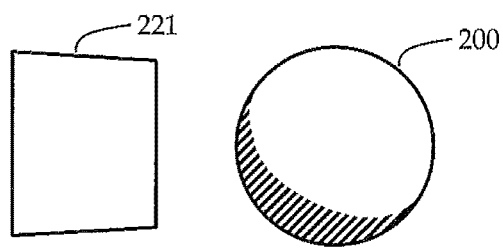
FIG. 28A is an example of a camera image of a reference surface and an object when no pattern is projected onto them.
Figure 28B:
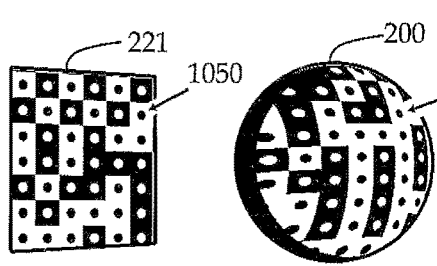
FIG. 28B is an example of a camera images of a reference surface and an object when a pattern is projected onto them.

FIG. 28A shows a first image of reference surface 221 and object 200 as captured by camera 210 (not shown). FIG. 28B shows the projection of area 1060 of patterned substrate 120 projected by projection module 230. Projected marker 1050 is visible on reference surface 221 and projected marker 1051 is visible on object 200.

Figure 28C:
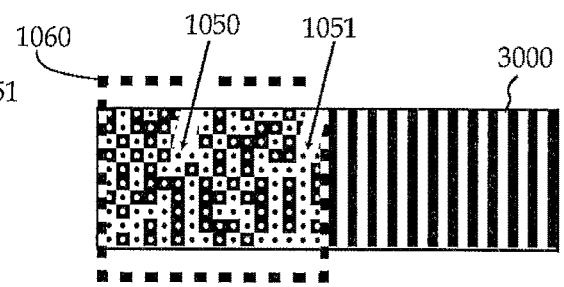
FIG. 28C is a schematic representation of the portion of a pattern which is projected onto a reference surface and object, resulting in the image shown in FIG. 28B.

FIG. 28C illustrates area 1060 of patterned substrate 120 projected in FIG. 28B. Marker 1050 is visible, which is visible on reference surface 221 in FIG. 28B. Marker 1051 is visible, which is visible on object 200 in FIG. 28B.

Figure 28D:
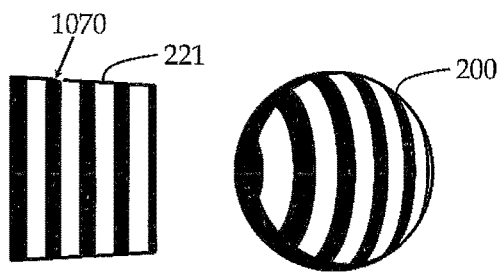
FIG. 28D is an example of a camera image of a reference surface and an object when a pattern is projected onto them.
Figure 28E:
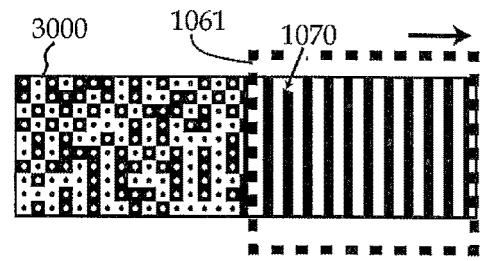
FIG. 28E is a schematic representation of the portion of a pattern which is projected onto a reference surface and object, resulting in the image shown in FIG. 28D.
Figure 28F:
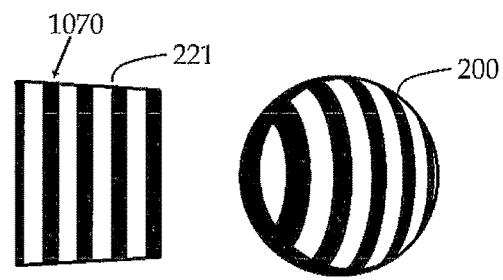
FIG. 28F is an example of a camera image of a reference surface and an object when a pattern is projected onto them.
Figure 28G:
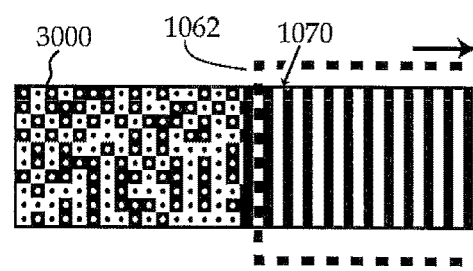
FIG. 28G is a schematic representation of the portion of a pattern which is projected onto a reference surface and object, resulting in the image shown in FIG. 28F.
Figure 28H:
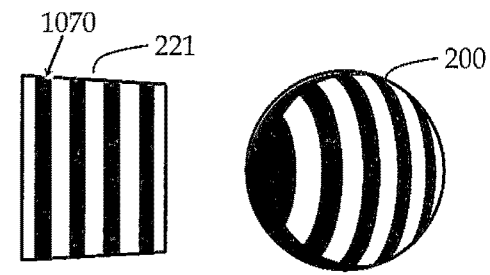
FIG. 28H is an example of a camera image of a reference surface and an object when a pattern is projected onto them.
Figure 28I:
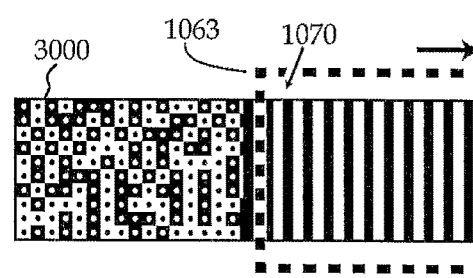
FIG. 28I is a schematic representation of the portion of a pattern which is projected onto a reference surface and object, resulting in the image shown in FIG. 28H.

FIG. 28D, FIG. 28F, and FIG. 28H show the projection of areas 1061, 1062, and 1063, respectively. These areas 1061, 1062, and 1063 are depicted along with patterned substrate 120 in FIG. 28E, FIG. 28G, and FIG. 28I, respectively. In each of the captured images (FIG. 28D, FIG. 28F, and FIG. 28H), projected line 1070 is projected onto a different location of reference surface 221. However, projected line 1070 remains at the same location on patterned substrate 120, but is shifted relative to the projected areas 1061, 1062, and 1063. The projection of the line pattern onto object 200 may be used to compute phase.

Figure 29:
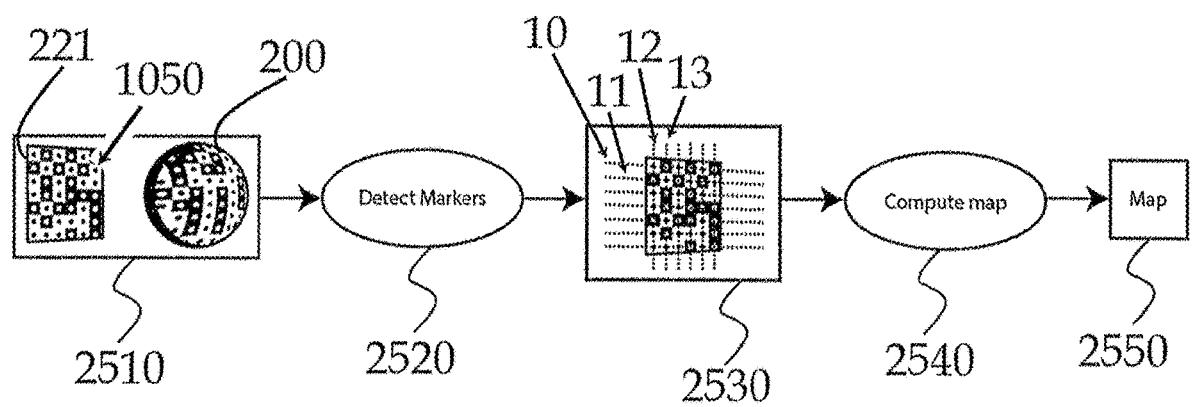
FIG. 29 is a schematic view of the method of computing a map from a captured marker pattern.

FIG. 29 illustrates the method of computing a map from a captured marker pattern. Image 2510 shows reference surface 221 and object 200. A pattern exemplified by marker 1050 is projected onto reference surface 221. These markers are then detected using 2520, which outputs a grid exemplified by dotted lines 10, 11, 12, and 13. This grid is used by 2540 to compute map 2550.

When patterned substrate 120 is projected onto a reference surface 221, the projected pattern exemplified by marker 1050 in FIGS. 28 and 29 will be distorted because of the relative orientation of reference surface 221, projector 230, and camera 210. Because reference surface 221 does not have a fixed orientation with respect to projector 230 or camera 210, the projected pattern exemplified by marker 1050 on reference surface 221 will appear differently in camera image 2510 depending on orientation of reference surface 221. Hence, to correlate the projected pattern exemplified by marker 1050 with the position of patterned substrate 120, a mapping between reference surface 221 and patterned substrate 120 must be calculated when the system is first used, or if the orientation of reference surface 221 changes before any subsequent capture. In general, reference surface 221 will remain in the same orientation during capture and in general does not need to change between captures. This method treats projector 230 as though it were a camera and simulates a distortion-corrected remapped image 2660 that would have been captured if a virtual camera captured an image from the perspective of projector 230. Hence, given an image 2510 of reference surface 221 onto which patterned substrate 120 is projected, the method can remap captured image 2510 to match coordinate system of projection plane 110 of patterned substrate 120. That is, the method remaps camera image 2510 to match the perspective of projector 230. U.S. Patent Application US20070115484A1 (Huang) (2006) and U.S. Pat. No. 7,929,751B2 (Zhang) (2006) relate to methods to treat a projector as a camera but require that vertical and horizontal phase images be projected, which requires a precise and uniform shift of the projected patterns and cannot compensate for any deviations. In contrast, the method described herein only requires the projection of a single correspondence pattern exemplified by marker 1050 and can compensate for mechanical positioning error of patterned substrate 120. This method will be called the "movement-correct phase-shifting method".

The movement-correct phase-shifting method requires the generation of map 2550 between a captured image exemplified by image 2510 and the known pattern on the patterned substrate 120. Map 2550 can be used to transform a different captured image exemplified by 2640 from the coordinate systems of camera 210 to coordinate system of projection plane 110 of patterned substrate 120. Map 2550 can be generated in at least one of two ways. The first method (referred to herein as "3D to 2D mapping") uses the known 3D coordinates of a marker printed on marker board 220, the calibrated intrinsic parameters, and extrinsic relationship between camera 210 and projector 230. Given a pixel of an image exemplified by image 2510 captured by camera 210 centered on a point on marker board 220, the method computes the corresponding 3D world coordinate, and then computes the location on patterned substrate 120 that projects to this point. In one embodiment, marker board 220 is a flat surface, which enables the use of planar geometry to generate map 2550 from a camera image exemplified by 2510 to coordinate system of projection plane 110 of projector 230. This allows any camera pixel depicting a point on marker board 220 to be transformed into a coordinate of coordinate system of projection plane 110 of patterned substrate 120, so that the image exemplified by 2510 can be remapped to match the perspective of projector 230.

An alternate method to create map 2550 is introduced herein and will be referred to as "direct 2D mapping." Given an image exemplified by image 2510 of patterned substrate 120 projected onto reference surface 221, the method computes the correspondence between the center of each pixel of image exemplified by image 2510 and the associated coordinate on coordinate system of projection plane 110 of patterned substrate 120. The projected pattern exemplified by projected marker 1050 contains at least two markings exemplified by marker 3010 and 3011 (FIG. 27) that have a known spatial relationship. For instance, a grid may be projected such that any two points on the grid have a known relative position. In the "3D to 2D mapping" method, the process of undistorting an image exemplified by image 2510 to correct for perspective requires the known 3D coordinates of a marker printed on a marker board 220, which are obtained using the 2D intrinsic parameters of camera 210 and the 3D extrinsic relationship between camera 210 and projector 230. In contrast, the "direct 2D method" uses one projected pattern directly to undistort a different projected pattern.

For instance, patterned substrate 120 may contain two regions, one with a circle grid pattern exemplified by marker 3010 and 3011 (FIG. 27) and another with a sinusoidal pattern exemplified by line 3020 and 3021 (FIG. 27). First, the region containing the circle grid pattern exemplified by marker 1050 is projected onto reference surface 221 and captured by camera 210, and the captured image exemplified by image 2510 is used to generate map 2550 between reference surface 221 and patterned substrate 120. Then, the region containing the sinusoidal pattern exemplified by lines 3020 and 3021 (FIG. 27) is projected onto reference surface 221 and captured by camera 210, and the captured image exemplified by image 2640 is remapped using map 2550. The remapped image exemplified by image 2660 contains a sinusoidal pattern exemplified by marker 1070 projected onto reference surface 221 that simulates what would have been captured if projector 230 also acted as a camera. Thus, the period of the sinusoid exemplified by marker 1070 remains constant for large deviations in orientation of reference surface 221. That is, the distortion-corrected remapped image exemplified by 2660 can compensate for a different orientation of reference surface 221 at the beginning of the image capture. The "direct 2D method" thus allows map 2550 to be generated even without intrinsic or extrinsic calibration of camera 210 or projector 230.

With either the "3D to 2D mapping" method or the "direct 2D mapping" method, camera 210 captures an image exemplified by 2640 of a pattern projected onto reference surface 221 or marker board 2210.

Figure 30:
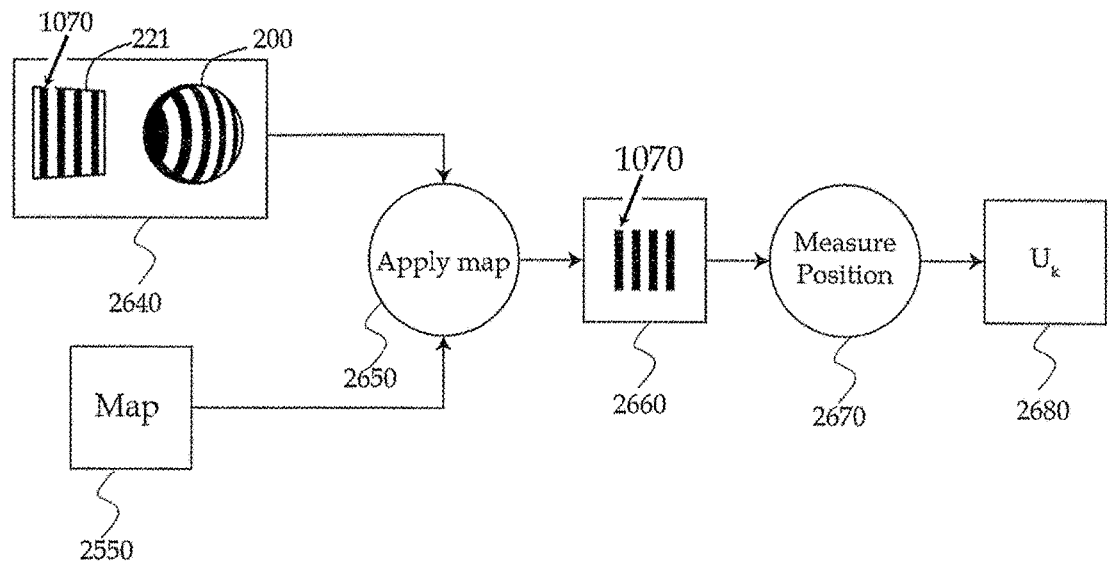
FIG. 30 is a schematic view of the method of remapping an input image and measuring its position.

FIG. 30 illustrates the method of method of remapping an input image and measuring its position. Image 2640 captures a reference surface 221 and object 200. A line pattern exemplified by line 1070 is projected onto the object. Image 2640 is remapped 2650 using map 2550. The distortion-corrected remapped image 2660 has a remapped line pattern exemplified by line 1070. The position of this line is determined by measurement process 2670 to produce a position 2680. Distortion-corrected remapped image 2660 allows the position 2680 of patterned substrate 120 to be estimated.

In either the "3D to 2D mapping" or the "Direct 2D mapping" methods, a pattern exemplified by marker 1050 is projected onto reference surface 221 to allow remapping of additional projected images. In some embodiments, the additional projected images will be line or sinusoidal patterns exemplified by line 1070 that are shifted by a small amount each frame exemplified by image 2640. These images are remapped using their respective mapping method in step 2650 and the resulting distortion-corrected remapped images exemplified by remapped image 2660 are used to estimate the movement of patterned substrate 120 between a first position and a second position. During movement, a marker exemplified by line 1070 on patterned substrate 120 will retain the same coordinate $(u^s, v^s)$ on patterned substrate 120 but that marker will move relative to the coordinate system $(u^p, v^p)$ of projection plane 110. Hence the movement of each marker will be measured with respect to the $(u^p, v^p)$ coordinate system of projection plane 110. The position of a marker in the distortion-corrected remapped image exemplified by remapped image 2660 which has moved with respect to the $u^p$ axis exhibits a movement of $\Delta u^p(t)-\Delta u^p(t-1)$. This movement is detected in step 2670 and can be determined either in the image domain or the phase domain. Because the ($u^p$, $v^p$) coordinate system of projection plane 110 is fixed with respect to camera 210 (not shown), it is functionally similar to the image sensor in a camera and therefore can be considered to have virtual pixels that match the remapped image exemplified by remapped image 2660. Let $I^P(u^p, v^p, t)$ represent the intensity of remapped projector pixel ($u^p$, $v^p$) at time t. The purpose of motion estimation in step 2670 is to estimate the translation $\Delta u^p$ of a marker exemplified by marker 1070 located at ($u^p$, $v^p$) on projection plane 110 from time t to time t+$\Delta$t. Then $I^P(u^p+\Delta u^p, t+\Delta t)$ will correspond to the same markers as $I^P(u^p, v^p, t)$.

The process of applying the map in step 2650 using the "3D to 2D mapping" method is as follows: First, the markers exemplified by 1010 and 1012 (FIG. 9) of marker board 220 are used to determine the 3D orientation of marker board 220, which provides a 3D coordinate for every pixel within the boundary of marker board 220 on the captured image. Then, for each coordinate ($u^c$, $v^c$) in the captured image, the world coordinate ($X^W$, $Y^W$, $Z^W$) is computed and projected to the coordinate ($u^p$, $v^p$) on projection plane 110 (not shown). The intensity $I^C(u^c, v^c)$ is then placed on a distortion-corrected remapped image $I^P(u^p, v^p)$. The result of this process is a simulated view $I^P$ as though marker board 220 had been captured from the projection lens.

In the image domain, the optical flow equation for movement over time $\Delta t$ is given by:

$$I^P(u+\Delta u, v, t+\Delta t) = I^P(u, v, t) + \frac{\partial I^P(u, v)}{\partial u}\Delta u + \frac{\partial I^P(u, v)}{\partial t}\Delta t$$

There are many methods to solve for the movement $\Delta u$, including phase correlation, block-based methods, and differential methods such as the Lucas-Kanade method. The Lucas-Kanade method is applicable for estimating the translation of a rigid object because it assumes that the motion is constant throughout a field surrounding the pixel, which approximates the movement of patterned substrate 120 (not shown).

In the phase domain, the movement can be determined by using knowledge of the pitch P of the sinusoid in projector coordinates. A projected sinusoid with mean value $\alpha$ and amplitude $\beta$ at some remapped projector pixel $I^P(u^p, v^p, t)$ is given by:

$$I^P(u, v, t) = \alpha + \beta \sin\left(\frac{2\pi}{P}u + \phi_0 + \phi(t)\right).$$

Here, $\phi_0$ represents the initial phase and $\phi(t)$ represents the phase at time t. Because the sinusoid is constant vertically and only varies with respect to axis $u^p$, the phase can be computed by spatially integrating over some integer M periods in the $u^p$ direction, which corresponds to MP pixels. The phase is given by:

$$\phi(t) = \arctan\left[\frac{\sum_{i=1}^{MP} \sin(2\pi i/P)I^P(u+i, v, t)}{\sum_{i=1}^{MP} \cos(2\pi i/P)I^P(u+i, v, t)}\right] - \phi_0.$$

Note that this phase $\phi(t)$ is computed spatially over multiple pixels of a single remapped projected image exemplified by image 2660, rather than temporally over a single pixel of multiple remapped projector images captured at different times. The difference in phase $\Delta\phi(t)$ can be converted to a difference in the position $\Delta u^p$ of patterned substrate 120 in the space remapped to projector coordinate system of projection plane 110 (FIG. 2) by using the period P:

$$\Delta u^P(t) = \frac{P \cdot [\Delta\phi(t)]}{2\pi}$$

For a series of images, the cumulative displacement 2680 of a line exemplified by line 1070 with respect to the first image at t=0 is given by:

$$U(t) = \sum_{i=0}^{t} \Delta u^P(t)$$

The cumulative displacement U(t) 2680 represents the measured distance of patterned substrate 120, but because of mechanical movement, this value may deviate from the desired movement, which is represented by $\tilde{U}_k$. For example, if using an N-step algorithm using a line pattern exemplified by line 1070 wherein each line has a width of P=18 μm, then patterned substrate 120 should move by $$\left(\frac{18}{N}\right)\mu m$$

each step so that $\tilde{U}_k=(k\cdot 18 \mu m)/N$. This movement could also be measured in terms of phase or simulated pixels rather than specific units. For instance, if measuring the movement with respect to phase, then the desired phase at image k would be given by $\tilde{\phi}_k=2\pi k/N$. If measuring the movement with respect to simulated projector pixels, then with pitch P=18 and N-step N=9, the step in which $\tilde{U}_k=kP/N$ would be equivalent to acquiring interpolated images when the pixel shift $\tilde{U}$ is {0, 2, . . . , 14, 16} pixels.

After each image is captured and its movement determined, it is labeled with an absolute position with respect to image k=0. If $\Delta_k$ represents the movement of the $k^{th}$ image with respect to image (k−1), then the absolute position with respect to k=0 is:

$$U_k = \sum_{j=1}^{k} \Delta u_j$$

An algorithm may have requirements for the movement of the patterned substrate each frame. The intended movement is denoted by $\Delta\tilde{u}$. For instance, an algorithm may require that the movement of patterned substrate 120 each frame is equal to 1 projector pixel, that is, $\Delta\tilde{u}_k=1$ for all k. This would result in absolute position 2680 ($\tilde{U}$) given by:

$$\tilde{U}_k = k$$

However, limitations in hardware make it very difficult to achieve uniform motion between steps. Thus, during capture in which patterned substrate 120 is mechanically moved, the measured positions may be, for example, $\Delta u_1=0.25$, $\Delta_2=1.1$, $\Delta u_3=0.5$, etc. This would indicate that patterned substrate 120 did not move uniformly each step and any captured images under such conditions would fail to meet the assumptions of an algorithm relying on uniform movement.

Figure 31:
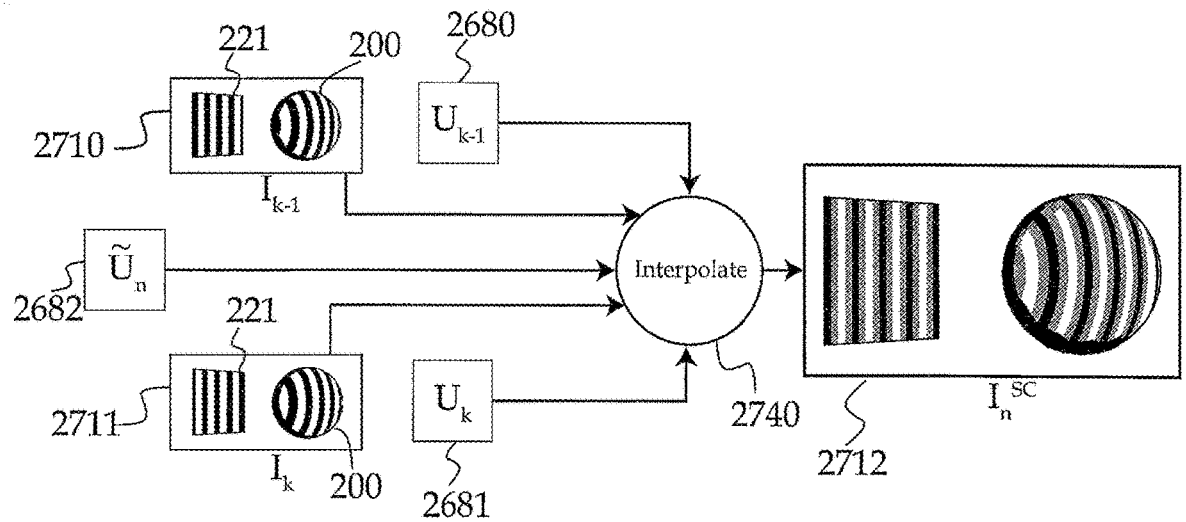
FIG. 31 is a schematic view of the process of temporal interpolation.

FIG. 31 depicts the process of temporal interpolation. Camera 210 captures two images 2710 and 2711. Each image 2710 and 2711 contain reference surface 221 and object 200. Patterned substrate 120 is at a different position 2680 and 2681 in each image 2710 and 2711, respectively. A desired position 2682 ($\tilde{U}_n$) is used along with images 2710, 2711 and positions 2680, 2681 to produce a temporally-simulated camera image 2712. Temporally-simulated camera image 2712 approximates the image that would be captured by camera 210 if patterned substrate 120 were at a position 2682 rather than at measured position 2680 or measured position 2681. Position 2680 can then be used to produce temporally interpolated images exemplified by 2712 that temporally simulate the images that would have been captured had patterned substrate 120 moved some desired amount 2682. For instance, if patterned substrate 120 moved inconsistent distances between each captured image exemplified by image 2640, those images could be interpolated to simulate images exemplified by 2712 of patterned substrate 120 moving identical distances each frame. This method overcomes the limitations of imprecise mechanical movement by compensating deviations from desired movement. The temporally-simulated images exemplified by 2712 can thus be used when precise movement is required, such as with a phase-shifting method.

To produce images exemplified by image 2712 that satisfy the assumptions of an algorithm (such as uniform movement each step), captured images $I^C$ exemplified by image 2710 and 2711 must be temporally interpolated to simulate camera images $I^{SC}$ exemplified by image 2712 that represent what would have been captured from camera 210 if patterned substrate 120 had moved uniformly. This process is referred to herein as "temporal interpolation." Given the positions $U_0, U_1, \ldots, U_N$ exemplified by position 2680 (FIGS. 30 and 31) of patterned substrate 120 corresponding to each camera image $I_0^C, I_1^C, \ldots, I_N^C$ exemplified by camera images 2710 and 2711 and a desired substrate position 2682 ($\tilde{U}_m$), select k such that $$U_{k-1} < \tilde{U}_m \leq U_k.$$

For example, with a three-step phase algorithm and pitch P=18, between each image, patterned substrate 120 (not shown) should move $\Delta\tilde{u}_k=6$ pixels in projection coordinate system of projection plane 110 for $0<k<3$. This would yield cumulative movements $\tilde{U}=\{0,6,12\}$ exemplified by cumulative movement 2682. If four images exemplified by captured images 2710 and 2711 are captured at interpolated cumulative positions $U=\{0,5,9,13\}$ exemplified by cumulative positions 2680 and 2681, then the first simulated image exemplified by temporally simulated image 2712 would be $I_0^C$ (because $U_0=\tilde{U}_0=0$). The second simulated image would be interpolated between images $I_1^C$ and $I_2^C$ (because $5<\tilde{U}_1<9$), and the third simulated image would be interpolated between images $I_2^C$ and $I_3^C$ (because $9<\tilde{U}_2<13$).

In some embodiments, the number of captured images greatly exceed the number of temporally simulated images. In that case, simulated images may be chosen so that interpolation is performed with the image whose measured cumulative position is slightly less than and the image whose measured cumulative position is slightly more than the desired position.

In some embodiments, the images may be captured out of order and then rearranged to a specific order to satisfy the requirements of interpolation. Suppose that patterned substrate 120 contains lines exemplified by line 1070 (FIG. 28) with a width of W=18 μm. If patterned substrate 120 is moved by 7 μm, then if 18 images exemplified by image 2710 and 2711 are captured, patterned substrate 120 (not shown) will have the following sequence of positions: {7 μm, 14 μm, 21 μm, ..., 112 μm, 119 μm}. Since the line pattern exemplified by line 1070 (not shown) is periodic, the captured images exemplified by image 2710 and 2711 may be reordered according to their distance from the closest multiple of W. That is, for W=18 μm, the above sequence of positions is equivalent to: {7 μm, 14 μm, 3 μm, ..., 4 μm, 11 μm}. If the images exemplified by image 2710 and 2711 captured with this sequence of positions exemplified by positions 2680 and 2681 is reordered based on this new sequence of positions, then the reordered images would have the following sequence of positions: {0 μm, 1 μm, 2 μm, ..., 16 μm, 17 μm}. The reordered images would be treated as though they had been captured in that order and with the adjusted positions. In general, patterned substrate 120 may not be guaranteed to move an integer distance each frame. In that case, given a line width W and a total moved distance of D, the adjusted position is given by $$D' = D - \left\lfloor \frac{D}{W} \right\rfloor W.$$

To simulate an output image exemplified by image 2712 using two or more input images exemplified by images 2680 and 2681, a multitude of interpolation algorithms can be used, including but not limited to linear interpolation, spherical interpolation (Slerp), trigonometric interpolation, the Discrete Fourier Transform (DFT), and Lanczos interpolation.

One method is linear interpolation between two images exemplified by 2710 and 2711. The linear interpolation coefficient γ for an output image m exemplified by image 2712 may be calculated using desired image position 2682 ($\tilde{U}_m$), and measured image positions 2680 and 2681 ($U_{k-1}$, $U_k$):

$$\gamma = \frac{\tilde{U}_m - U_{k-1}}{U_k - U_{k-1}}.$$

Each pixel of the linear-interpolated image $I_m^{SC}$ exemplified by image 2712 is given by:

$$I_m^{SC}(u,v) = (1-\gamma)I_{k-1}^C(u,v) + \gamma I_k^C(u,v).$$

It is important to note that the linear interpolation coefficient γ does not need to be calculated for each pixel (u, v), but once for each combination of input and output images.

When the input images contain a sinusoidal pattern exemplified by line 1070 (FIG. 28), linear interpolation may produce an output image in which the amplitude β(u, v) for each pixel is less than in the input images. Thus, if the input image exemplified by image 2710 and 2711 exhibits a generally sinusoidal intensity variation in which the number of images before the sinusoid repeats is represented by period P, then spherical interpolation (Slerp) may be used. Slerp uses the linear coefficient γ and angle T<π to produce two additional coefficients $\gamma_0$, $\gamma_1$:

$$T = \frac{2\pi(U_k - U_{k-1})}{P},$$

$$\gamma_0 = \frac{\sin[(1-\gamma)T]}{\sin[T]},$$

$$\gamma_1 = \frac{\sin[\gamma T]}{\sin[T]}.$$

The coefficients $\gamma_0$, $\gamma_1$ can be applied to each pixel (u, v) of the input image exemplified by images 2710 and 2711 to obtain Slerp-interpolated image $I_m^{SC}$ exemplified by image 2712:

$$I_m^{SC}(u,v) = \gamma_0 I_{k-1}^C(u,v) + \gamma_1 I_k^C(u,v).$$

In the case that the position of patterned substrate 120 of both frames is equal (that is, $\tilde{U}_m = U_k = U_{k-1}$), the output pixel may be linearly interpolated between the input pixels:

$$I_m^{SC}(u,v) = (1-\alpha_0)I_{k-1}^C(u,v) + \alpha_0 I_k^C(u,v).$$

where $0 \le \alpha_0 \le 1$. Two simple cases are where $\alpha_0 = 1$, in which the pixel $I_k^C(u, v)$ current frame is used, and where $\alpha_0 = 0.5$, in which frames k and (k−1) are averaged.

For the first image, in which $\tilde{U}^0 = U_0 = 0$, no interpolation is required, and the following equation can be used:

$$I_0^{SC}(u,v) = I_0^C(u,v).$$

As in linear interpolation, the coefficients $\gamma_0$, $\gamma_1$ do not need to be computed for each pixel but rather only when there is a change in position of patterned substrate 120 between images exemplified by images 2710 and 2711. In both the linear interpolation and Slerp interpolation methods above, the coefficients $\gamma$, $\gamma_0$, and $\gamma_1$ do not depend on the image intensity values directly but rather depend only on $\tilde{U}_m$, $U_k$, and $U_{k-1}$. Since cumulative positions 2680 ($U_{k-1}$) and 2681 ($U_k$) represent measurements with respect to time and are thus associated with all pixels of the image, they can be measured by examining a portion of the image and applying it to the entire image. That is, if position 2680 ($U_k$) of patterned substrate 120 is measured by examining an image exemplified by image 2710 containing reference surface 221, it can still be used to interpolate different camera pixels of object 200 being scanned with unknown geometry. That is, only the region of image 2710 containing reference surface 221 is required to measure coefficients that apply to the entirety of image 2710.

Figure 32:
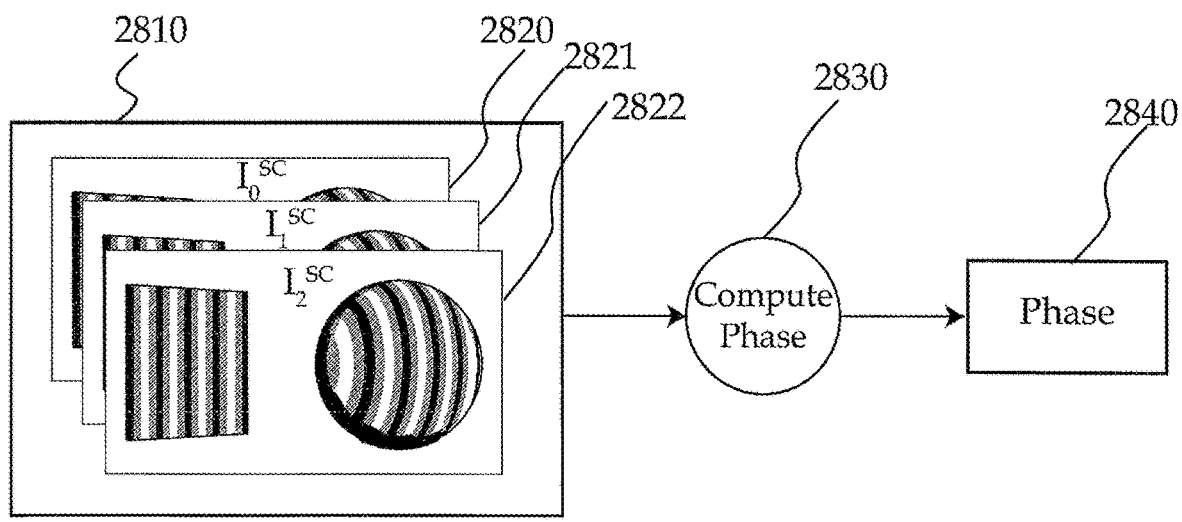
FIG. 32 is a schematic view of the process of phase computation.

FIG. 32 depicts the process of phase computation. The set 2810 of three temporally-simulated camera images 2820, 2821, and 2822 are used with some phase computation algorithm 2830, outputting a phase 2840. In some embodiments, the set 2810 may contain more than three images. In some embodiments, phase computation algorithm 2830 may be a three-step phase algorithm. In some embodiments, phase computation algorithm 2830 may be an N-step phase algorithm, where N is an integer greater than three.

Some embodiments may include an N-step phase algorithm, where $N \ge 3$. During step 2830, the motion-corrected simulated images exemplified by images 2820, 2821, and 2822 are used to compute a relative phase. The relative phase $\phi(u, v)$ of pixel (u, v) can be temporally computed using the standard N-step phase algorithm:

$$\phi(u, v) = \arctan\left[\frac{\sum_n I_n^{SC}(u,v)\sin(2\pi n/N)}{\sum_n I_n^{SC}(u,v)\cos(2\pi n/N)}\right].$$

Note that for any pixel ($u^{SC}$, $v^{SC}$), this algorithm uses the same pixel over multiple temporally interpolated simulated camera frames, exemplified by images 2820, 2821, and 2822. This phase $\phi(u^{SC}, v^{SC})$ is bounded between $[0,2\pi)$ or $[-\pi, \pi)$, and is referred to as the "relative phase." It is often desired to obtain an "absolute phase" $\Phi(u^{SC}, v^{SC})$, which includes an integer step q such that $\Phi(u^{SC}, v^{SC}) = \phi(u^{SC}, v^{SC}) + q2\pi$. To compute the absolute phase, the relative phase must be unwrapped, which can be achieved by spatial unwrapping, multi-wavelength unwrapping, or the use of a coded pattern. A coded pattern may include gray codes, de Bruijn codes, a dot pattern, a random pattern, or other marked pattern. In some cases, the coded pattern may be identical along some axis, so that the code can only be distinguished along some other axis.

Note that the relative phase equation that provides $\phi(u^{SC}, v^{SC})$ for each pixel ($u^{SC}, v^{SC}$) uses the temporally-simulated camera images exemplified by images 2820, 2821, and 2822 rather than the projected remapped images exemplified by remapped image 2660 (FIG. 30) or the original, captured images exemplified by images 2710 and 2711 (FIG. 31). Rather, the simulated images exemplified by images 2820, 2821, and 2822 are produced in such a way to temporally simulate what would have been captured if patterned substrate 120 had moved an equal distance each step n, and thus provide lower error when computing the phase $\phi(u^{SC}, v^{SC})$. Note that the distortion-corrected remapped images exemplified by image 2660 (FIG. 30) are only used to estimate the patterned substrate position, and the process of distortion-correction is not applied to the captured images during temporal simulation of images exemplified by image 2712.

Figure 33:
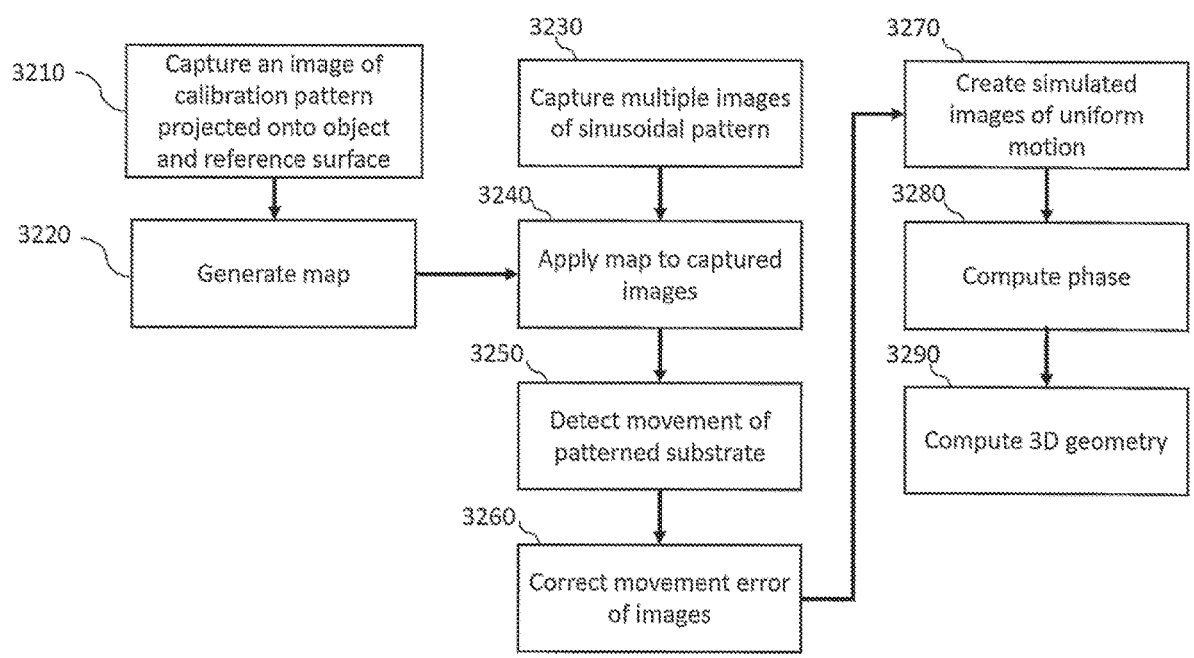
FIG. 33 is a schematic view of the movement compensation phase-shifting algorithm.

FIG. 33 depicts a schematic of the movement-compensated phase-shifting method. In step 3210, camera 210 captures an image of reference surface 221 onto which patterned substrate 120 is projected. Step 3220 uses the captured image to establish a map between some portion of the camera pixels of camera 210 and patterned substrate 120.

In some embodiments, the reference surface used in step 3210 is marker board 220. In the "3D to 2D mapping" method, an image $I^C(t)$ of marker board 220 is captured and the printed markers exemplified by marker 1050 are detected. Each detected marker j exemplified by marker 1050 has an associated camera coordinate $P_j^C = (u_j, v_j)$ and local 3D coordinates $P_j = (X_j, Y_j, Z_j)$, defined about the origin of marker board 220. If the marker board is planar, then often the features will have coordinates with either Z=0 or Z=1.

Once one or more markers exemplified by marker 1050 (FIG. 29) are acquired, their local 3D coordinates are used to determine the orientation of marker board 220 with respect to camera 210. One method of determining the orientation of marker board 220 uses a world transformation, comprised of rotation matrix R and translation matrix T, that projects the world coordinates to the coordinates of camera 210. The intrinsic matrix A of camera 210 correlates the transformed point to image coordinates. Given a marker j exemplified by marker 1050 with image coordinates $P_j^C = (u_j, v_j)$ and local coordinates $P_j = (X_j, Y_j, Z_j)$, the combination of extrinsic transformation [R|T] and intrinsic matrix A is said to project the coordinates if $$s \begin{bmatrix} u_j \\ v_j \\ 1 \end{bmatrix} = A[R|T] \begin{bmatrix} X_j \\ Y_j \\ Z_j \\ 1 \end{bmatrix}$$

where s is a scaling factor. The transformation [R|T] can be estimated using a PnP solver, RANSAC, least squares, or other matrix or geometry solver.

If marker board 220 is a flat plane, then within image captured by camera 210 depicting marker board 220, there is a bijective correspondence between any image coordinate (u, v) and its corresponding 3D point $(X^W, Y^W, Z^W)$ on marker board 220. The transformation is produced using the coordinates of the captured markers, but these coordinates may be sparse in the camera image such that there are pixels that do not correspond directly to a marker. However, the transformation matrix may be applied to every pixel in the marker board region, including those that do not correspond to a marker. For instance, this method enables the interpolation of 3D coordinates for pixels in between the circle centers of a circle grid printed on marker board 220.

The "3D to 2D mapping" method requires calibration of camera 210 and projector module 230. This calibration is used to estimate the intrinsic and extrinsic parameters of camera 210 and projector module 230. The intrinsic parameters include but are not limited to the focal length and distortion parameters. The extrinsic parameters include but are not limited to the rotation and translation between camera 210 and projector 230. Such calibration can be achieved by projecting a portion of patterned substrate 120 onto marker board 220 at various positions. If patterned substrate 120 remains fixed, then a collection of positions of marker board 220 can be used to estimate the extrinsic parameters of camera 210 and projector 230 because marker board 220 contains markers exemplified by marker 1010 and 1012 with a dimensional relationship in physical units. Once these calibration parameters are estimated, a transformation can be generated between any coordinate of camera 210 and coordinate of projector 230 for which the world coordinate is known. In general, a world coordinate system defines a single origin and rotation that relates the local coordinate systems of multiple objects. For some local coordinate $P_j=(X_j, Y_j, Z_j)$, the corresponding coordinate $(u_j^P, v_j^P)$ in projection plane 110 (FIG. 2) is obtained via $$s'' \begin{bmatrix} u_j^P \\ v_j^P \\ 1 \end{bmatrix} = A^P [R^P | T^P] \begin{bmatrix} X_j \\ Y_j \\ Z_j \\ 1 \end{bmatrix}$$

with scaling factor s".

In step 3230, additional images of reference surface 221 and object 200 are captured by camera 210 while projector 230 projects a portion of patterned substrate 120. In step 3240, these images are remapped using the distortion-correction map generated in step 3220, and in step 3250 each distortion-corrected remapped image is processed to estimate the relative shift of patterned substrate 120. The estimated shift remains associated with the corresponding captured image. In step 3260, a new set of desired positions are created such that the motion of patterned substrate 120 is uniform between each image. In step 3270 the captured images and the new set of desired positions of patterned substrate 120 are used to temporally simulate a new set of images that simulate some precise and predetermined movement. In step 3280, these new temporally-simulated images are used to generate a phase, and in step 3290 this phase is used to compute 3D geometry.

In one embodiment, patterned substrate 120 contains a region of generally sinusoidal intensity variation along one axis for use with an N-step phase-shifting algorithm. The sinusoidal variation has a period P and the desired displacement of the patterned substrate between each image is P/N. The method disclosed herein ensures a displacement of P/N between temporally interpolated images regardless of the actual movement of the patterned substrate. The N-step phase-shifting algorithm is applied to the temporally interpolated images rather than the captured images.

Figure 34:
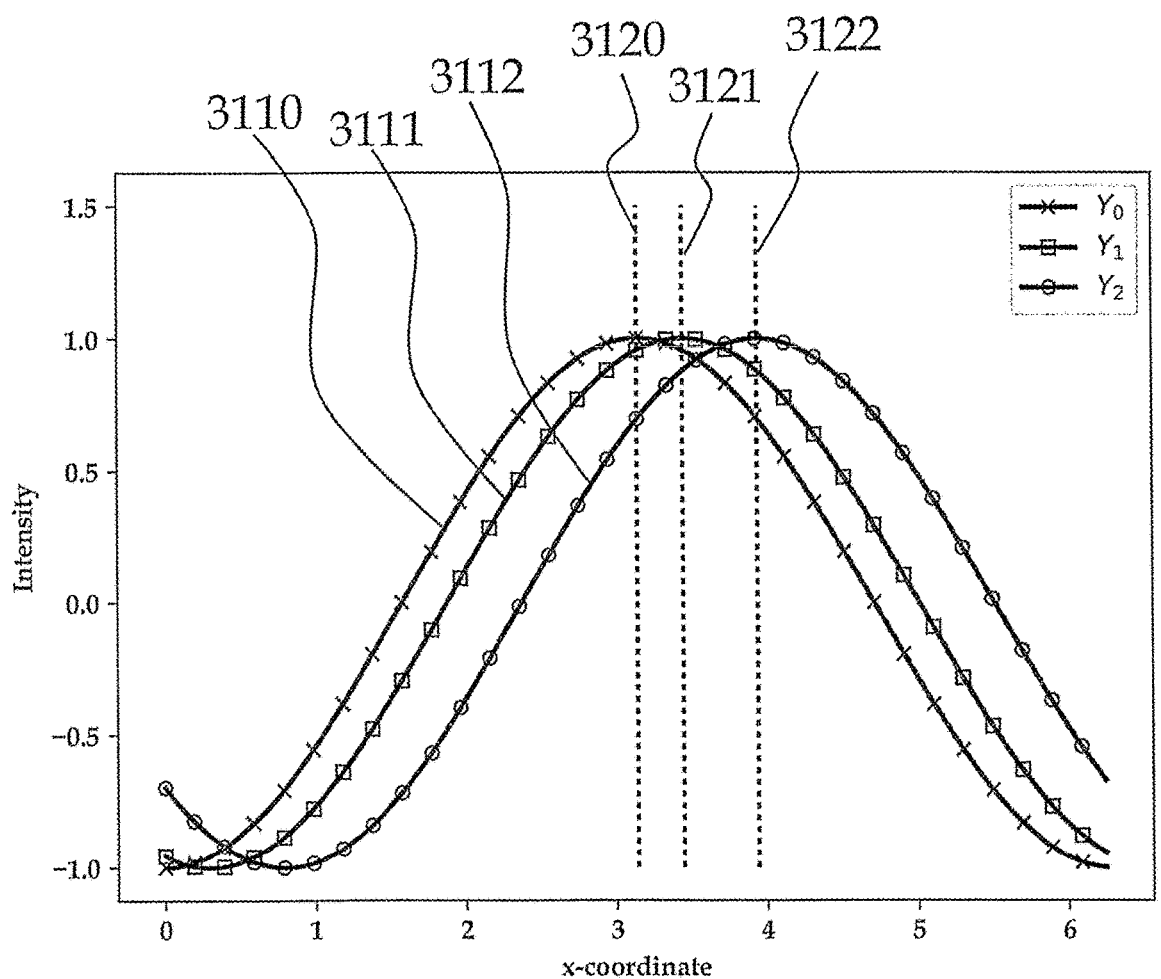
FIG. 34 is a plot of normalized simulated intensity values for three time-sequential images of a projected pattern where the movement of the projected pattern between images is non-uniform.

FIG. 34 depicts a plot of the simulation of intensity values of an image of reference surface 221 captured by camera 210 as a function of x-coordinate. Image intensities 3110, 3111, and 3112 represent a sinusoid with mean zero and intensity 1. Image intensities 3110, 3111, and 3112 are simulated to peak at dotted lines 3120, 3121, and 3122, respectively. The difference in x-coordinates between dotted lines 3121 and 3120 is different than the difference in x-coordinates between dotted lines 3121 and 3122. This simulates irregular movement of projected patterned substrate 120.

Figure 35:
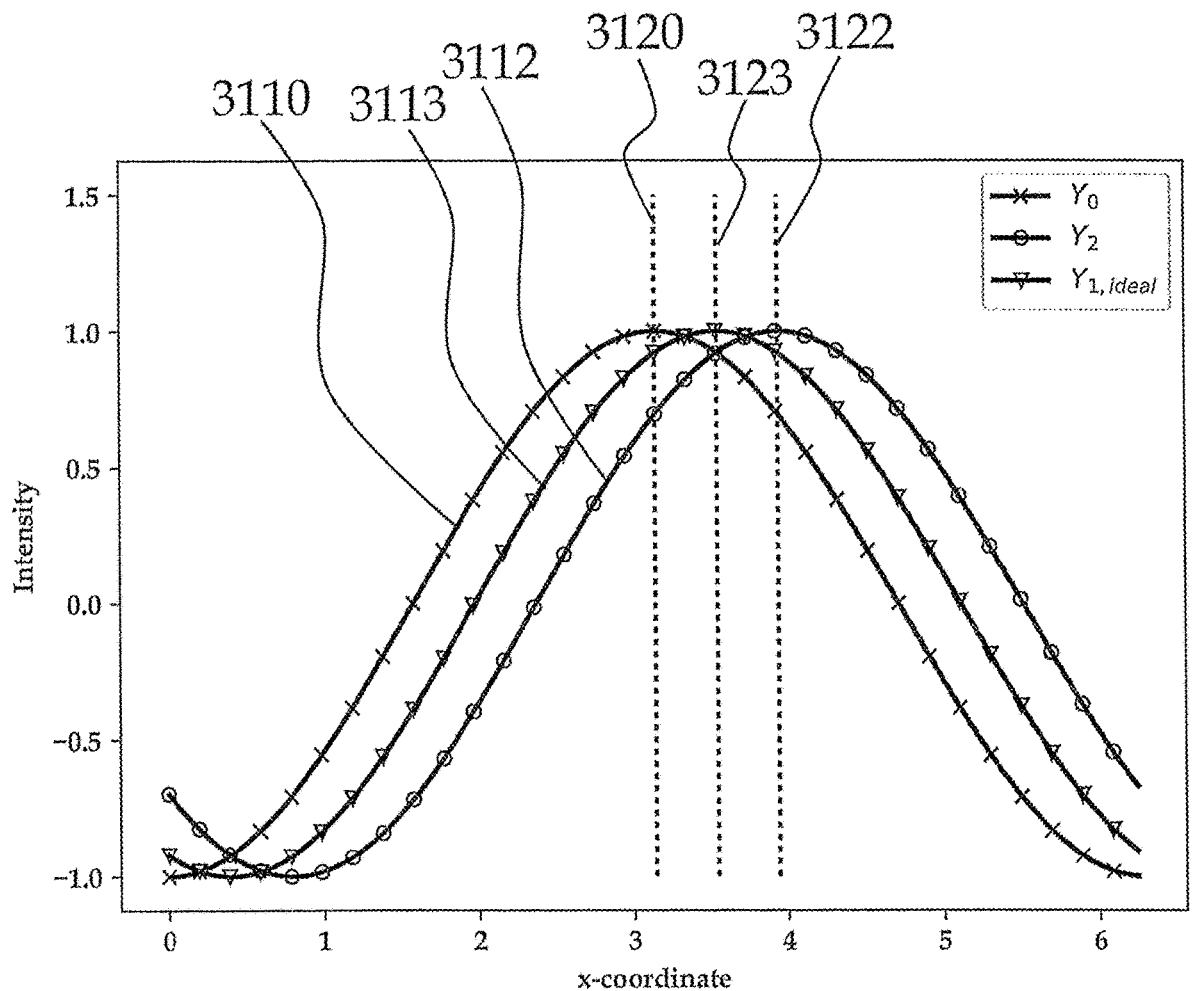
FIG. 35 is similar to FIG. 34 except the movement of the projected pattern between images is uniform.

FIG. 35 is like FIG. 34, except that the difference in x-coordinates between dotted lines 3123 and 3120 is equal to the difference in x-coordinates between dotted lines 3123 and 3120. Thus, temporally simulated image intensities 3110, 3112, and 3113 represent movement of projected patterned substrate 120 in equal steps.

Figure 36:
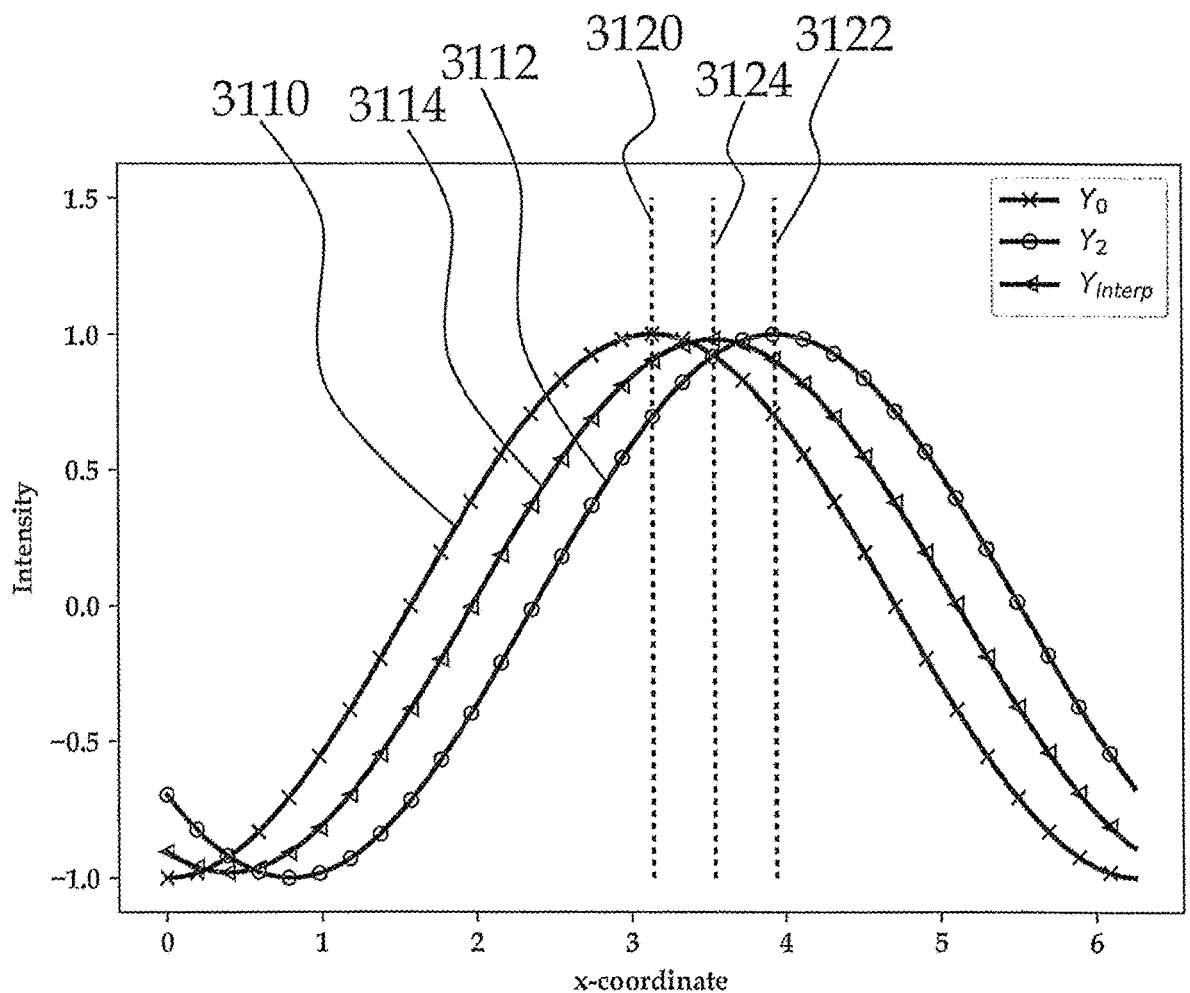
FIG. 36. is similar to FIG. 35 except the uniformity is simulated using linear interpolation of two of the intensity values in FIG. 34.

FIG. 36 shows the temporally interpolated intensity 3114 obtained using a linear interpolation algorithm. Intensities 3111 and 3112 (FIGS. 34 and 35) were used as input into the interpolation algorithm. The x-coordinates of vertical dotted lines 3121 and 3122 (FIGS. 34 and 35) were used as the measured pattern positions $U_{k-1}$ and $U_k$, respectively. The x-coordinate of dotted line 3124 was used as the desired pattern position $\tilde{U}_m$. The distance between the x-coordinate of lines 3124 and 3120 is identical to the distance between x-coordinates of lines 3124 and 3122. The peak of interpolated intensity 3114, which intersects dotted line 3124, is less than the peak of intensity 3110 or 3112. This is a result of the linear interpolation algorithm.

Figure 38:
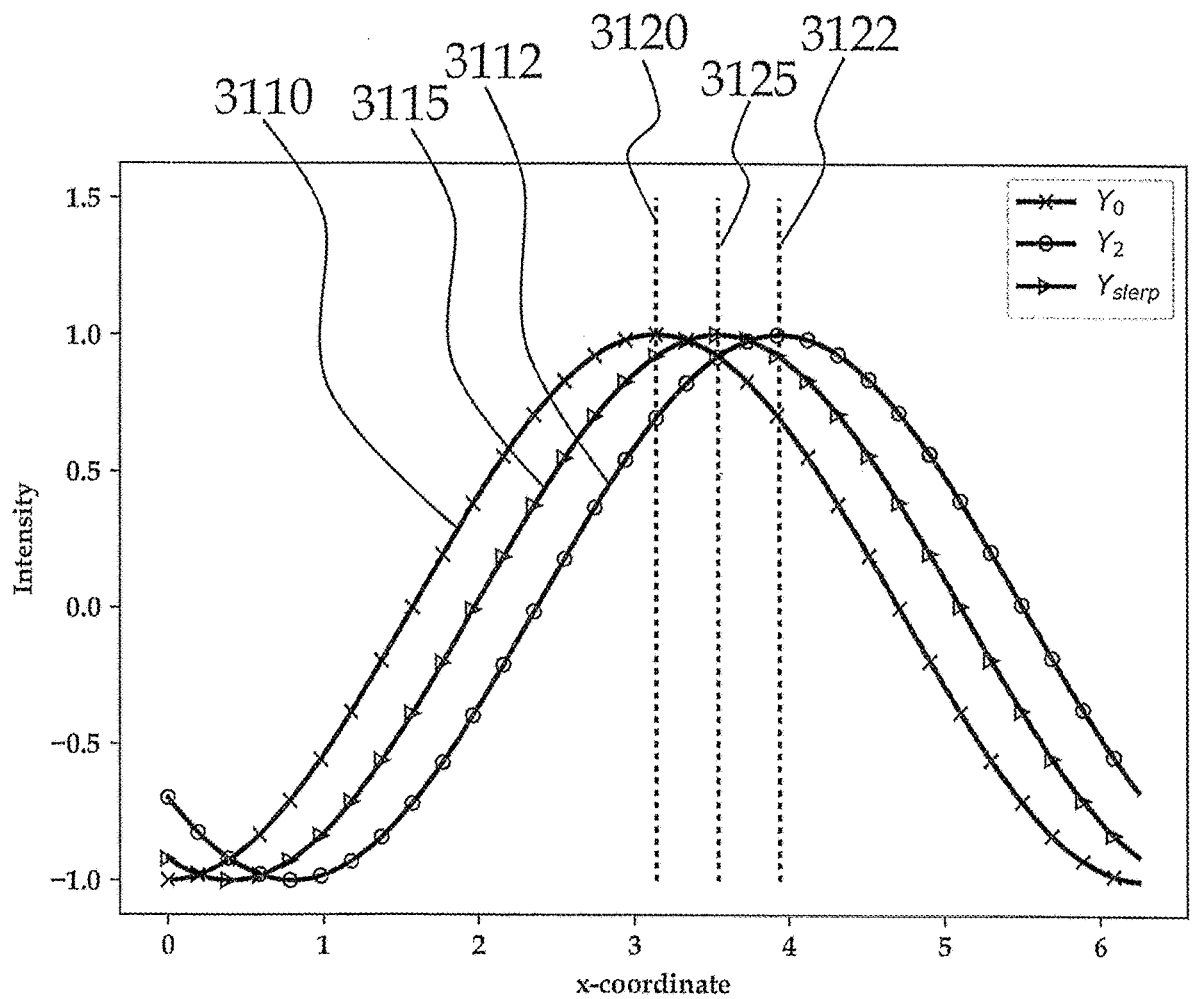
FIG. 38 is similar to FIG. 36 except Slerp interpolation is used rather than linear interpolation.

FIG. 38 shows the same data as FIG. 36, but with a smaller y-axis to show the peaks of intensities 3110, 3114, and 3112. Intensities 3110 and 3114 reach a maximum value of 1.0, shown as dotted line 3130, at dotted lines 3120 and 3122, respectively. Linear-interpolated intensity 3114 reaches a maximum value of 0.98, shown as dotted line 3134, at dotted line 3124. The decreased intensity of the linear-interpolated intensity 3114 is a result of the linear interpolation algorithm.

Figure 37:
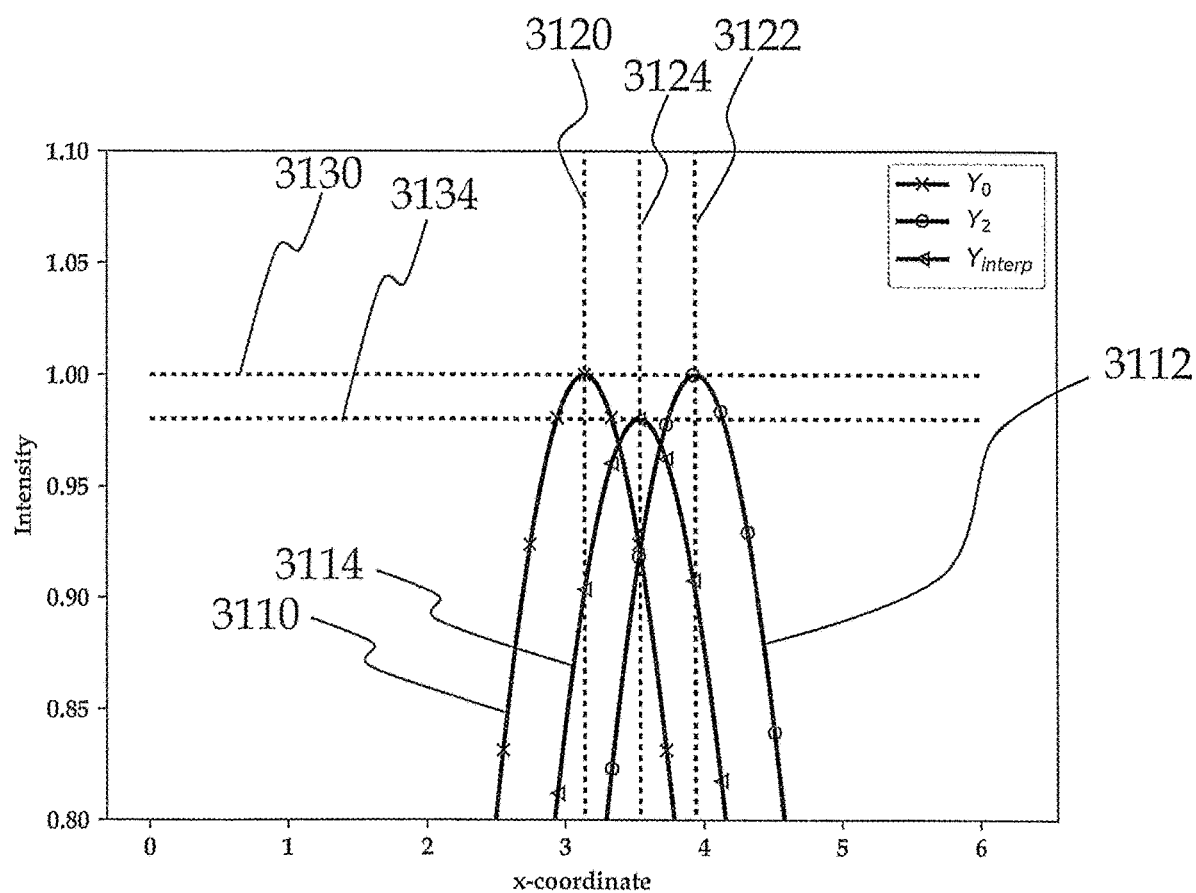
FIG. 37 is the same data as FIG. 36 with a different scaling of the y-axis to highlight the lower intensity of the interpolated image.
Figure 39:
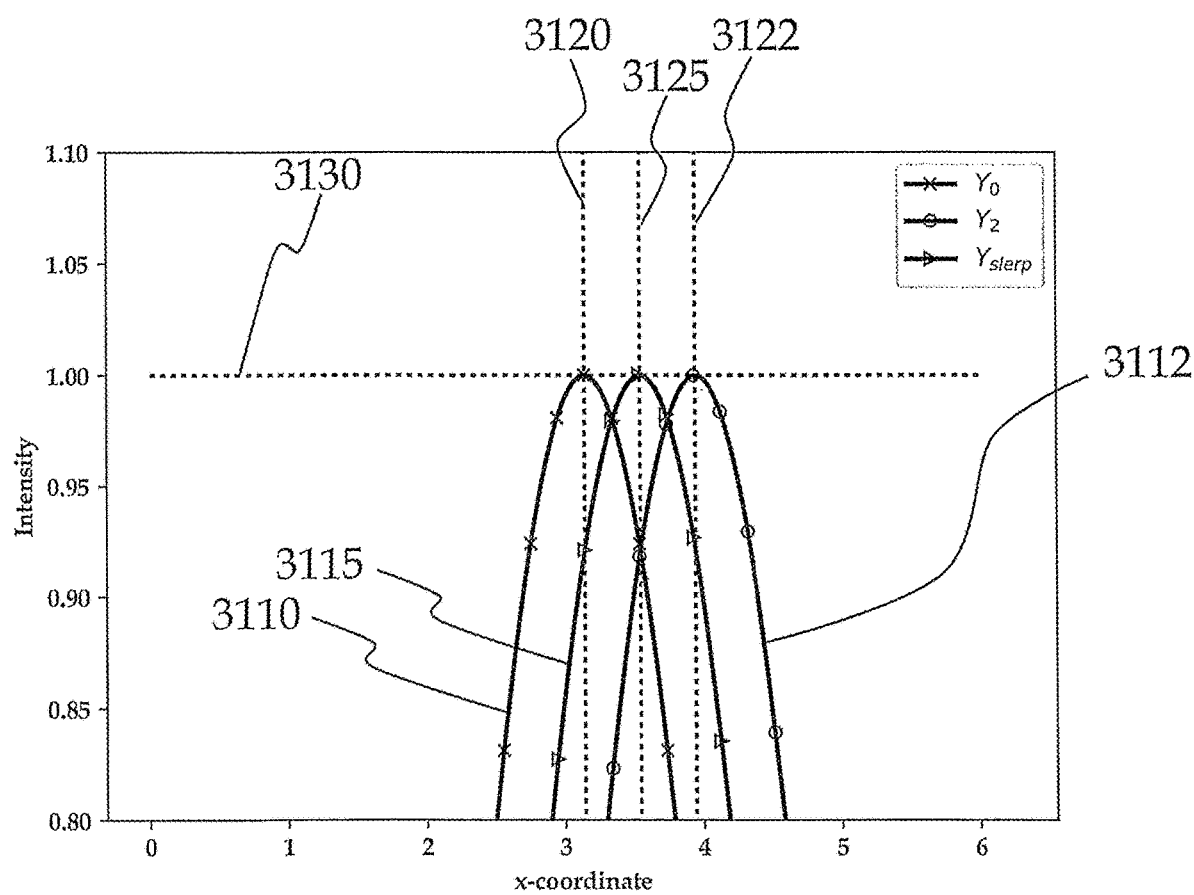
FIG. 39 is the same data as FIG. 38 with a different scaling of the y-axis to highlight the intensity of the Slerp-interpolated image.

FIG. 37 shows the interpolated intensity 3115 obtained using a spherical interpolation (Slerp) algorithm. Intensities 3111 and 3112 (FIG. 34) were used as input into the interpolation algorithm. The x-coordinates of vertical dotted lines 3121 and 3122 (FIG. 34) were used as the measured pattern positions $U_{k-1}$ and $U_k$, respectively. The x-coordinate of dotted line 3125 was used as the desired pattern position $\tilde{U}_m$. The distance between the x-coordinate of lines 3154 and 3120 is identical to the distance between x-coordinates of lines 3125 and 3122. Slerp-interpolated intensity 3115 reaches a maximum of 0.999733 at dotted line 3125. FIG. 39 shows the same data as FIG. 37, but with a smaller y-axis to show that Slerp-interpolated intensity 3115 achieves a maximum amplitude close to 3130. Intensities 3110 and 3112 reach a maximum of 1.0 at dotted lines 3120 and 3122, respectively. Slerp-interpolated intensity 3115 reaches a maximum of 0.999733 at dotted line 3125.

Figure 40:
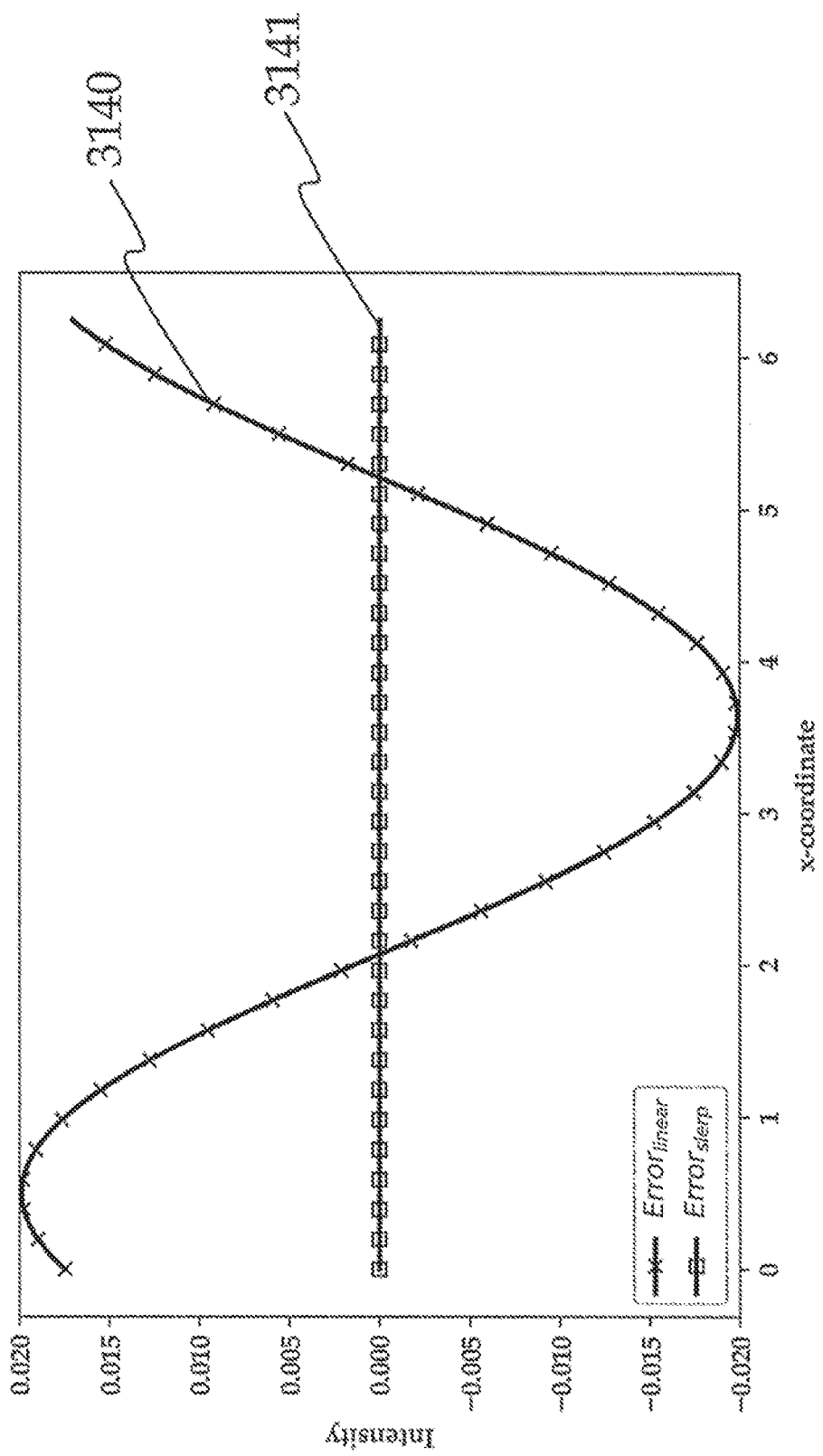
FIG. 40 is a plot comparing the intensity error due to linear and Slerp interpolation methods.
Figure 41A:
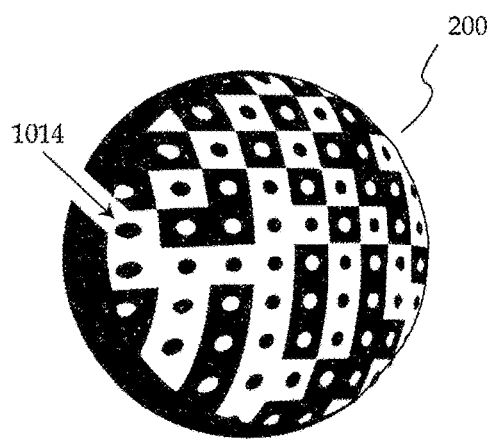
FIG. 41A is an example of a camera image of an object onto which a portion of the patterned substrate is projected.
Figure 41B:
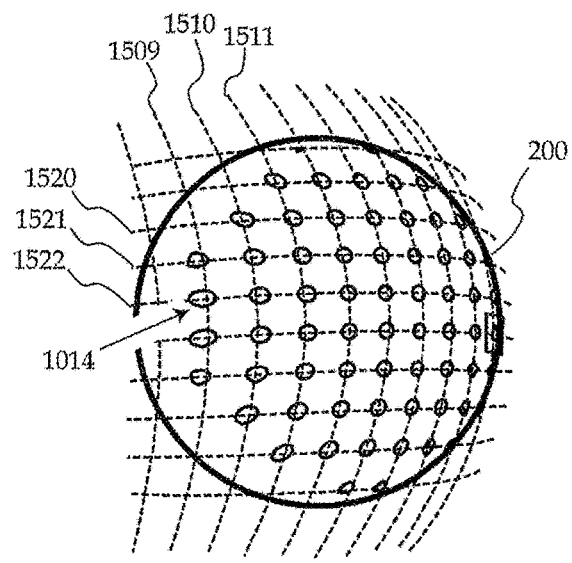
FIG. 41B is a schematic view showing detected markers on the object in FIG. 41A, and an example of a grid superimposed over the detected markers.
Figure 41C:
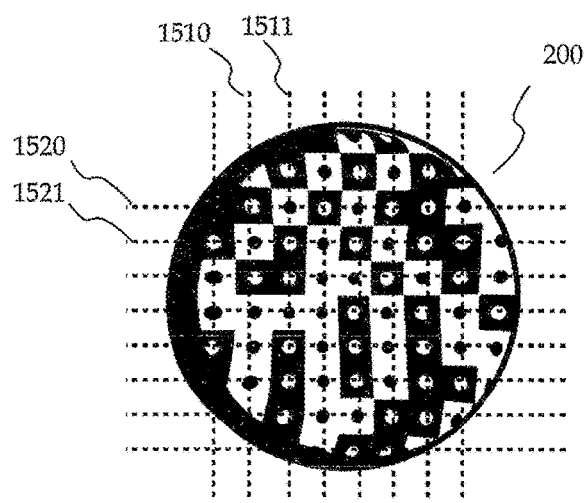
FIG. 41C is an example of a simulated image of an undistorted view of FIG. 41A.
Figure 41D:
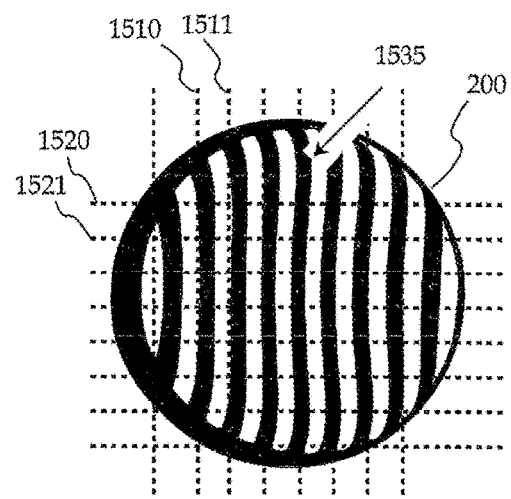
FIG. 41D is an example of a simulated image of an undistorted view of an image similar to that in FIG. 41A but when a different portion of the patterned substrate is projected onto it.

FIG. 40 shows the error of linear-interpolated intensity 3114 and Slerp-interpolated intensity 3115. Error 3140 was obtained by taking the difference between linear-interpolated intensity 3114 and ideal intensity 3113. Error 3141 was obtained by taking the difference between Slerp-interpolated intensity 3115 and ideal intensity 3113.

FIG. 41 shows a method of distortion-correction mapping wherein the projection of patterned substrate 120 onto object 200 is used directly to compute the distortion-correction map. FIG. 41A depicts an image captured by camera 210 wherein a region of patterned substrate 120, which contains at least one marker exemplified by marker 1014, is projected onto object 200. FIG. 41B depicts the result of applying marker detection to the image depicted in FIG. 41A. Lines 1520, 1521, and 1522 represent curves of constant vertical coordinate with respect to projector coordinate system 110, while lines 1510, 1511, and 1512 represent constant horizontal coordinate. Marker 1014 lies at the intersection of lines 1522 and 1509. FIG. 41C4€ shows the application of a distortion-correction mapping generated by making lines 1520, 1521, and 1522 parallel with each other and perpendicular to lines 1509, 1510, and 1511 in the distortion-corrected remapped image. FIG. 41D is similar to FIG. 41C, except that the image is captured such that patterned substrate 120 is in such a position that at least one line exemplified by 1535 is projected. The distortion of the projected region of patterned substrate 120 is sufficiently reduced that the shift of line 1535 can be measured and used to estimate the position of patterned substrate 120.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is:

1. A method for determining the three-dimensional geometry of an object, said method comprising:
projecting a first pattern from a first region of a patterned substrate onto an object and onto a marker board to create a first projected pattern, wherein the marker board includes a printed pattern thereon having a known marker in a predetermined color;
capturing the first projected pattern with a camera to produce a first image and storing the first image on a processor;
using the printed pattern to determine the three-dimensional orientation of the marker board;
changing the position of the patterned substrate relative to the projector;
projecting a second pattern from a second region of said patterned substrate onto the object and onto the marker board to create a second projected pattern;
capturing the second projected pattern with the camera to produce a second image and storing the second image on the processor;
estimating the relative position of the patterned substrate by comparing the first image with the second image;
using the first and second images captured on the processor and an interpolation algorithm to produce a temporally-simulated image which simulates an image captured when a third region of the patterned substrate is projected, wherein the simulated third region of the patterned substrate is between the first region and the second region;
using a temporally-simulated image to compute relative and absolute phase and compute the three-dimensional geometry of the object by applying a phase shifting algorithm.

2. The method of claim 1, wherein multiple temporally-simulated images are used to compute relative and absolute phase.

3. The method of claim 1, wherein at least one of the captured images contain at least one marker, and the method further comprises establishing a spatial relationship between said projector and said camera and using said spatial relationship to create a distortion-corrected remapped image of at least one of the captured images.

4. The method of claim 1 wherein the camera is adapted to view the printed markers in different color channels and the method further comprises capturing the first and second images with the camera using a color channel not capable of seeing the printed markers for determining the position of the reference surface relative to said camera.

5. The method of claim 1 wherein in the camera is adapted to view the printed markers in different color channels and the method further comprises capturing the first and second images with the camera using a color channel capable of seeing the printed markers.

6. A method for determining the three-dimensional geometry of an object, said method comprising:
projecting a first pattern from a first region of a patterned substrate onto an object and onto a reference surface to create a first projected pattern;
capturing the first projected pattern with a camera to produce a first captured image and storing the first image on a processor;
changing the position of the patterned substrate relative to the projector;
projecting a second pattern from a second region of said patterned substrate onto the object and onto the reference surface to create a second projected pattern;
capturing the second projected pattern with the camera to produce a second image and storing the second image on the processor;
estimating the relative position of the patterned substrate by comparing a known marker on the first image with a known marker on the second image;
using the first and second images captured on the processor and an interpolation algorithm to produce a temporally-simulated image which simulates an image captured when a third region of the patterned substrate is projected, wherein the simulated third region of the patterned substrate is between the first region and the second region;
using a temporally-simulated image to compute relative and absolute phase and compute the three-dimensional geometry of the object by applying a phase shifting algorithm.

7. The method of claim 6, wherein multiple temporally-simulated images are used to compute relative and absolute phase.

8. The method of claim 6, further comprising using an additional projected pattern to establish a spatial relationship between said additional projected pattern and said camera and using said spatial relationship to remap at least one image to captured by said camera to produce a distortion-corrected remapped image.

9. The method in claim 7, wherein said distortion-corrected remapped image is used to estimate the relative position of the patterned substrate in said captured image.

10. The method of claim 6 wherein the reference surface is a marker board having one or more printed markers thereon, said printed markers having a predetermined color.

11. The method of claim 10 wherein the camera is adapted to view the printed markers in different color channels and the method further comprises capturing the first and second images with the camera using a color channel not capable of seeing the printed markers for determining the position of the reference surface relative to said camera.

12. The method of claim 10 wherein in the camera is adapted to view the printed markers in different color channels and the method further comprises capturing the first and second images with the camera using a color channel capable of seeing the printed markers.

13. A method for determining the three-dimensional geometry of an object, said method comprising:
- projecting a first pattern from a first region of a patterned substrate onto an object to create a first projected pattern;
- capturing a first image of first projected pattern with a camera and storing the first image on a processor;
- using at least one marker projected by first region of said patterned substrate to create a mapping between the patterned substrate and camera image;
- changing the position of the patterned substrate relative to the projector;
- projecting a second pattern from a second region of said patterned substrate onto the object to produce a second projected pattern;
- capturing a second image of second projected pattern with the camera and storing the second image on the processor;
- estimating the relative position of the patterned substrate by comparing the first image with the second image;
- using the first and second images captured on the processor and an interpolation algorithm to produce a temporally-simulated image which simulates an image captured when a third region of the patterned substrate is projected, wherein the simulated third region of the patterned substrate is between the first region and the second region;
- using at least one temporally-simulated image to compute relative and absolute phase and compute the three-dimensional geometry of the object by applying a phase shifting algorithm.

14. The method of claim 13, further comprising projecting a region of the patterned substrate containing at least one marker to establish a spatial relationship between said projector and said camera and using said spatial relationship to remap an image captured by said camera to produce a distortion-corrected remapped image.

15. The method in claim 13, wherein said distortion-corrected remapped image is used to estimate the relative position of the patterned substrate in said captured image.

* * * * *